(12) United States Patent
Shiomoto et al.

(10) Patent No.: US 6,731,628 B1
(45) Date of Patent: May 4, 2004

(54) CIRCUIT-SWITCHED NETWORK

(75) Inventors: Kohei Shiomoto, Tokyo (JP); Naoaki Yamanaka, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/257,269

(22) Filed: Feb. 25, 1999

(30) Foreign Application Priority Data

| Feb. 26, 1998 | (JP) | 10-045693 |
| Feb. 26, 1998 | (JP) | 10-045707 |
| Feb. 26, 1998 | (JP) | 10-045744 |
| Feb. 26, 1998 | (JP) | 10-045767 |
| May 11, 1998 | (JP) | 10-127762 |
| May 11, 1998 | (JP) | 10-127788 |

(51) Int. Cl.[7] ............... H04L 12/66; H04L 12/28; H04L 12/56
(52) U.S. Cl. .............. 370/355; 370/352; 370/393
(58) Field of Search ................. 370/352–355, 370/389, 400–401, 392, 395.5, 0.52, 0.6

(56) References Cited

U.S. PATENT DOCUMENTS

| 5,016,247 A | * | 5/1991 | Cidon et al. | 370/370 |
| 5,115,426 A | * | 5/1992 | Spanke | 370/354 |
| 5,572,517 A | * | 11/1996 | Safadi | 370/431 |
| 5,586,112 A | * | 12/1996 | Tabata | 370/225 |
| 5,659,716 A | * | 8/1997 | Selvidge et al. | 395/500 |
| 5,862,126 A | * | 1/1999 | Irwin | 370/395 |
| 5,956,340 A | * | 9/1999 | Afek et al. | 370/412 |
| 5,987,136 A | * | 11/1999 | Schipper et al. | 709/245 |
| 6,181,684 B1 | * | 1/2001 | Turcotte et al. | 370/332 |
| 6,282,170 B1 | * | 8/2001 | Bentall et al. | 370/225 |
| 6,320,865 B1 | * | 11/2001 | Agrawala et al. | 370/413 |
| 6,324,175 B1 | * | 11/2001 | Shiomoto et al. | 370/357 |
| 6,363,079 B1 | * | 3/2002 | Barzegar et al. | 370/465 |

OTHER PUBLICATIONS

Shiomoto, et al., "Loss and Delay Analysis of Dynamic Flow Setup in ATM Networks", IEICE Transactions on Communications, vol. E81–B, No. 5, May 1998, pp. 1004–1015.
Yamanaka, et al., "DTM: Dynamic Transfer Mode" Technical Report of IEICE, SSE98–54 (Aug. 1998), pp. 19–24.
Easton, et al., "TASI–E Communications System", IEEE Transactions on Communications, vol. Com–30, No. 4, Apr. 1982, pp. 803–807.
Amstutz, "Burst Switching—An Update", IEEE Communications Magazine, Sep. 1989, pp. 50–57.
BOHM, et al., "Fast Circuit Switching for the Next Generation of High Performance Networks" IEEE Journal on Selected Areas in Communications, vol. 14, No. 2, Feb. 1996, pp 298–305.
Shiomoto, et al., "Performance Analysis of Dynamic Flow Setup in ATM Networks", IEEE, 1998, pp. 578–583.
Yamanaka, et al., "DTM: Dynamic Transfer Mode based on Short Holeded Circuit Switshing Technique Technique", Proceedings of the 1998 IEICE General Conference, The Institute of Electronics, Information and Communication Engineers, Mar. 27–30, 1998, pp. 34 and 39.

* cited by examiner

Primary Examiner—Melvin Marcelo
Assistant Examiner—Ronald Abelson
(74) Attorney, Agent, or Firm—Pillsbury Winthrop LLP

(57) ABSTRACT

A local switch serving a terminal constituting the destination of an IP packet is identified from the IP address of the packet, and time slot switching information is formed, this being information relating to a route through an STM network to this local switch. The packet can then be transferred through the STM network in accordance with this time slot switching information. As a result, a packet with an IP address can be transferred through an STM network.

6 Claims, 28 Drawing Sheets

Control Circuit — T1

| Output Line Number | Time Slot #1, #2, #3, #4 |
|---|---|
| #1 | * * * * |
| #2 | * * |
| ... | |
| #4 | * * |

4 to Burst Buffer
* Busy

FIG.6

Control Circuit — T1, T2

| Output Line Number | Time Slots #1, #2, #3, #4 | Reservation Table |
|---|---|---|
| #1 | * * * * | Time Slot = 2 |
| #2 | * * | |
| ... | | |
| #4 | * * | Time Slot = 1 |

FIG.7

| Time Slot Number | Line Number | Busy/Idle | |
|---|---|---|---|
| 0 | | | ~ T2 |
| 1 | | | |
| 2 | | | |
| 3 | | | |
| 4 | | | |
| 5 | | | |
| 6 | | | |
| 7 | | | |
| 8 | | | |

FIG.9

| Output Line Number | First Time Slot |
|---|---|
| 0 | 0 |
| 1 | 4 |
| 2 | 6 |

T4

| Time Slot Number | Output Line Number |
|---|---|
| 0 | 0 |
| 1 | 0 |
| 2 | 0 |
| 3 | 0 |
| 4 | 1 |
| 5 | 1 |
| 6 | 2 |
| 7 | 2 |
| 8 | 2 |

FIG.13

| Output Line Number | (first time slot, time slot after last time slot) |
|---|---|
| 0 | (0, 2),(8, 9) |
| 1 | (6, 8) |
| 2 | (2, 6) |

| Time Slot Number | Output Line Number |
|---|---|
| 0 | 0 |
| 1 | 0 |
| 2 | 2 |
| 3 | 2 |
| 4 | 2 |
| 5 | 2 |
| 6 | 1 |
| 7 | 1 |
| 8 | 0 |

| Time Slot Number | Output Line Number |
|---|---|
| 0 | 2 |
| 1 | 1 |
| 2 | 0 |
| 3 | 0 |
| 4 | 2 |
| 5 | 0 |
| 6 | 1 |
| 7 | 2 |
| 8 | 0 |

| DA | Next Switch | Time Slot Switching Information |
|----|-------------|--------------------------------|
|    |             |                                |

CIRCUIT-SWITCHED NETWORK

PRIOR APPLICATIONS

This application claims priority from Japanese Applications No. 10-45693 filed Feb. 26, 1998, No. 10-45707 filed Feb. 26, 1998, No. 10-45744 filed Feb. 26, 1998, No. 10-45767 filed Feb. 26, 1998, No. 10-127762 filed May 11, 1998 and No. 10-127788 filed May 11, 1998, the contents of which are incorporated hereinto by reference.

BACKGROUND OF THE INVENTION

1. Field of the Invention

The present invention relates to Synchronous Transfer Mode (STM) communications networks, and in particular to techniques for transferring data with an Internet Protocol (IP) address by way of an STM connection.

2. Description of Related Art

A feature of STM-based circuit-switched networks is that because signals on a physical channel are multiplexed into time slots and circuit-switched, the delay during communication is extremely short and there is no overhead such as the header required in Asynchronous Transfer Mode (ATM) where virtual paths and cells are employed. In a voice call, for example, quality problems arise and echo cancellers may be required if there is a delay of more than 20–30 ms. Not just in telephony, but also in video conferencing and other bidirectional services in general, it is preferable for delay to be short. From this point of view, STM is a transport mode which is well suited to digital telephone networks. However, a conventional STM-based circuit-switched network requires that data are transferred via an STM connection set up in advance from a source user terminal to a destination user terminal. Its applicability is therefore limited and such circuit-switched networks are only being considered for leased data circuits between large businesses.

On the other hand, in data communications based on an IP architecture; by writing the IP address, which is the identification number of a terminal, in the header of a packet and sending this to a network such as the Internet which supports IP, each router successively transfers the datagram without having to search for the destination corresponding to the address in question and without having to set up a connection between the two terminals which want to communicate. Thus no dedicated connection is required and data can be transferred by means of an extremely simple procedure. However, under this scheme delay is longer than in an STM-based circuit-switched network, and some overhead is necessary.

The present inventors have invented, and filed Application Ser. No. 09/205,612, a novel circuit-switched network which combines the advantages of an STM-based circuit-switched network with the advantages of data communications based on IP addresses. In the circuit-switched network disclosed in this prior patent application, burst data—i.e., a packet—which has been given a logical address such as an IP address, has its logical address analyzed within an STM network and is transferred through the network to the desired destination by means of the destination node E.164 address corresponding to the logical address of the packet's destination.

SUMMARY OF THE INVENTION

The present invention provides a novel circuit-switched network capable of transferring packets via an STM network using a different approach from that disclosed in the patent application outlined above.

A unique feature of the present invention is that it adds a further header to a packet which already has a header in which an IP address has been written, and thereby transfers the packet to the desired destination terminal via an STM network. The additional header contains routing information relating to the route up to the local switch serving the terminal constituting the destination indicated by the IP address, this information having been set in advance by the local switch serving the source terminal. A further feature of this invention is that, during this process, the transit switches relocate an arrived packet from one time slot to a different time slot on the basis of the routing information written in the packet header. It follows that dedicated connections are not set up in advance in the STM network. Instead, each time a switch receives a packet it sets up the time slot in which the packet will be carried at that point in time. As a result, high bit rate data transfer can be carried out as simply and easily as in data communications based on the IP architecture mentioned above, with the entire network acting as if it were an enormous router.

Namely, the present invention provides a circuit-switched network comprising a plurality of local switches each serving at least one terminal, and at least one transit switch connecting these local switches, these local switches and the at least one transit switch being connected via an STM network, wherein each local switch comprises: means for receiving a packet arriving from a terminal, said packet having a header in which an IP address has been written; a table in which is recorded routing information indicating which route should be used for transfer through the STM network to this IP address; means for adding to the packet a header in which is written the routing information corresponding to this IP address, said routing information having been obtained by looking up the table; and means which looks at this added header and transfers the packet in a time slot corresponding to said routing information.

The aforesaid at least one transit switch preferably comprises: means for looking at the header of the packet written in a time slot, the aforesaid routing information having been written in this header; and means for relocating the packet, in accordance with the result obtained by this look-up means, in a time slot corresponding to the routing information written in the header. This routing information is preferably time slot switching information indicating in which time slot the packet is to be written at each transit switch. The time slot switching information is thus information indicating the order of the time slot relocations required when a packet is transferred through the STM network, these relocations being carried out at each transit switch and at the local switch serving the destination terminal.

Preferably, each local switch and transit switch is also provided with means which, if the aforementioned time slot is busy, temporarily stores the packet until the time slot in question becomes idle. This ensures that a packet is not discarded when there is no idle time slot.

The temporary storage means can include means for investigating, at fixed time intervals, whether a time slot is idle or not. It can also include means which, if a time slot is not idle, makes a reservation so that the packet will be preferentially placed in that time slot when the slot becomes idle.

Temporary storage means can be provided for each input line. This avoids the situation where there is no idle time slot on the line used to transfer packets from the input lines to the temporary storage means. It also prevents a high volume of traffic from a particular input line to the temporary storage means hindering packet transfer from another input line to the temporary storage means.

A transit switch can include: means which obtains, from the routing information written in the header of data which has arrived in a time slot, the number of the output line to which this data should be forwarded; means for searching for an idle time slot among the time slots which can be used for an output line with this number; and means which relocates the arrived data in the idle time slot found by this search means.

In this case the search means can comprise means which uses the result of computing a hash function (which treats the output line number as a variable x) as the time slot number corresponding to that output line number. Alternatively, the time slot numbers can run in numerical order, and the output line numbers can be set in correspondence with these time slot numbers. The output line numbers as a whole run in numerical order, but each output line number is repeated the same number of times as the number of time slots allocated for possible use by that output line, and the search means can be provided with a table in which are recorded the output line numbers and the first time slot number of the time slots corresponding to this output line number. Alternatively, the time slot numbers in numerical order can be grouped according to their associated output line number, and the search means can be provided with a table in which are recorded the output line numbers and, corresponding to these output line numbers, the first time slot number of a given group of time slot numbers and the next time slot number after the last number of that group. It is also feasible to provide means for monitoring, for each time slot, whether that time slot is idle or not, and for the search means to comprise a table in which are recorded chains of time slot numbers corresponding to output line numbers, and means which, in accordance with the results obtained by the monitoring means, removes the numbers of busy time slots from the chains and adds the numbers of idle time slots to the chains.

A plurality of routes can be established between source and destination local switches, and the source local switches and at least some of the transit switches disposed at the branch points in these routes can be provided with: a table in which is recorded information mapping these routes to their allocated time slots; and means for looking up this table and selecting one of the routes in accordance with information relating to the destination of the arrived data. This selection means can also include time slot selection means which gives priority to there being few transit switches on the route to the destination.

In this case, the time slot selection means can include means for selecting a time slot corresponding to the route in which there are fewest transit switches on the way to the destination. The time slot selection means can also include means which, when the time slot corresponding to the route with fewest transit switches is being used for another communication, selects the time slot corresponding to the route with the next fewest number of transit switches to the destination. The time slot selection means can also include means which, when the time slot corresponding to the route with the fewest transit switches is being used for another communication, selects a time slot corresponding to another route, irrespective of the advance setting of routes to various destinations.

The temporary storage means preferably includes means for storing the order in which packets are stored, and means which outputs packets in accordance with this order, starting from the first packet that was stored. It can also comprise timing means which begins timing as soon as a packet is stored, and means which outputs a packet when this timing means has reached a prescribed time. The temporary storage means can also comprise means in which a queue is provided for each time slot corresponding to a different route, and which causes a plurality of packets heading on the same route to be stored in a queue of time slots corresponding to this route.

According to this invention, there is provided a plurality of routing information corresponding to a plurality of discrete route sections. Each transit switch can include means which classifies this plurality of routing information into used routing information and unused routing information, and means for selecting the unused routing information from the routing information arriving at the switch. This classifying means can include means which appends to used routing information a bit indicating that the routing information has been used, and means which deletes used routing information.

BRIEF DESCRIPTION OF THE DRAWINGS

Embodiments of this invention will be described with reference to the accompanying drawings, of which:

FIG. 6 gives an example of the configuration of a table for ascertaining whether a time slot is idle;

FIG. 7 gives another example of the configuration of a table for ascertaining whether a time slot is idle;

FIG. 9 gives an example of the configuration of a table for finding an idle time slot;

FIG. 13 shows a relation between time slot number and output line number;

FIG. 14 shows an example of a table provided in the control module for finding an idle time slot;

DETAILED DESCRIPTION OF THE PREFERRED EMBODIMENTS

Figure 1:
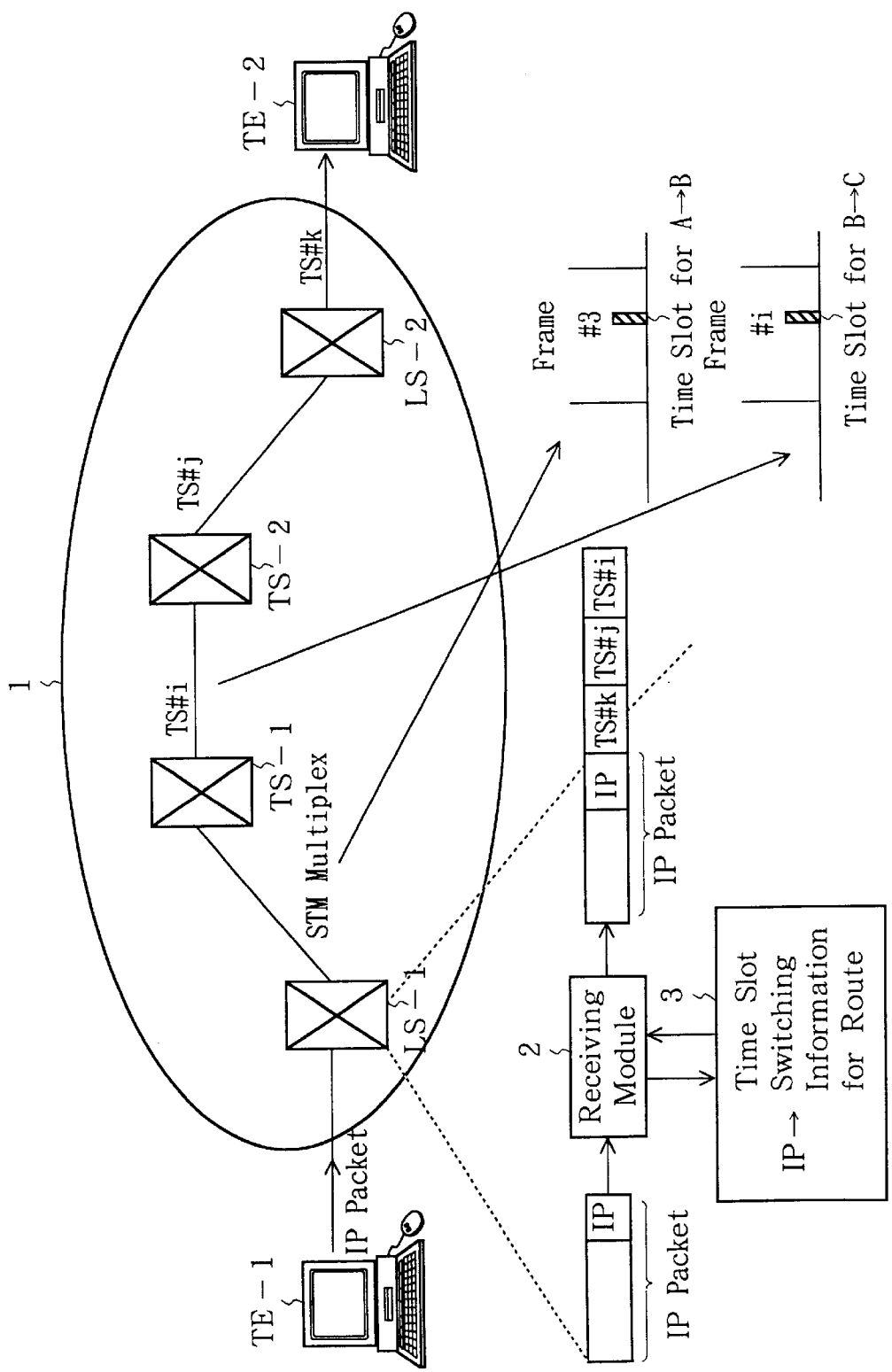
FIG. 1 shows the basic configuration of a circuit-switched network.

FIG. 1 shows the basic configuration of a circuit-switched network comprising local switches LS-1 and LS-2 respectively serving terminals TE-1 and TE-2, and transit switches TS-1 and TS-2 which connect local switches LS-1 and LS-2 to one another. The local switches and transit switches together comprise STM network 1.

The following explanation assumes that a packet is to be transferred from terminal TE-1 to terminal TE-2. Consequently, although local switch LS-1 is treated as a source node and local switch LS-2 as a destination node, and they are described as if they were different devices, in practice they are identical and their positions can be reversed.

Figure 2:
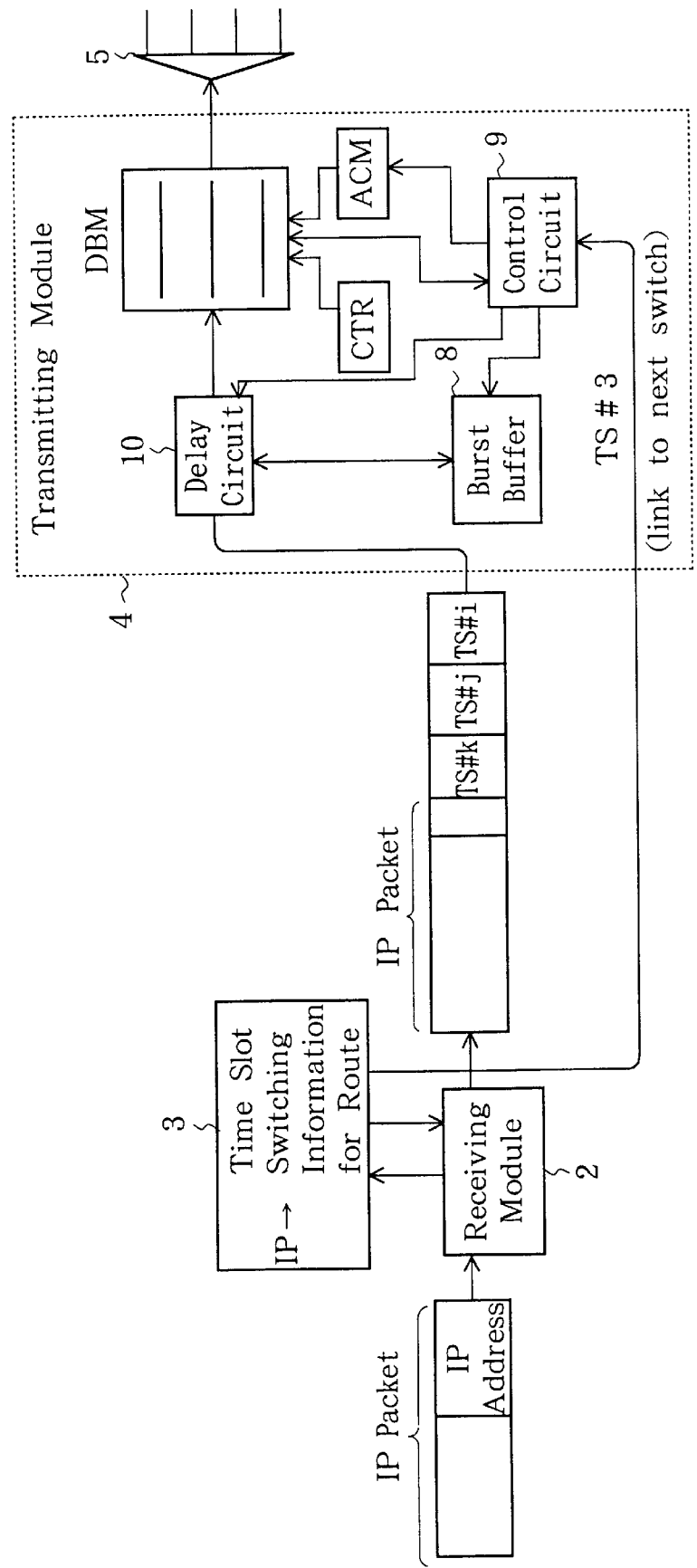
FIG. 2 is a block diagram of the main parts of a local switch.

FIG. 2 is a block diagram of the main parts of local switch LS-1, which comprises: receiving module 2 for receiving an IP packet arriving from terminal TE-1, said IP packet having a header in which an IP address is written; and table 3 in which is recorded routing information for STM network 1 corresponding to this IP address. Receiving module 2 adds to the IP packet a header in which is written the routing information corresponding to the IP address, this routing information being obtained by looking up table 3. Local switch LS-1 further comprises transmitting module 4 which transfers the IP packet in a time slot corresponding to the route to the destination, and demultiplexing module 5 for separating the output time division multiplex highway of transmitting module 4. Transmitting module 4 comprises data buffer memory DBM, sequential counter CTR and address control memory ACM for switching time slots by sequential write random read, burst buffer 8 for temporarily storing packets until idle time slots are available, control circuit 9 for controlling modules within transmitting module 4, and delay circuit 10 for compensating for the delay introduced by control circuit 9.

Figure 3:
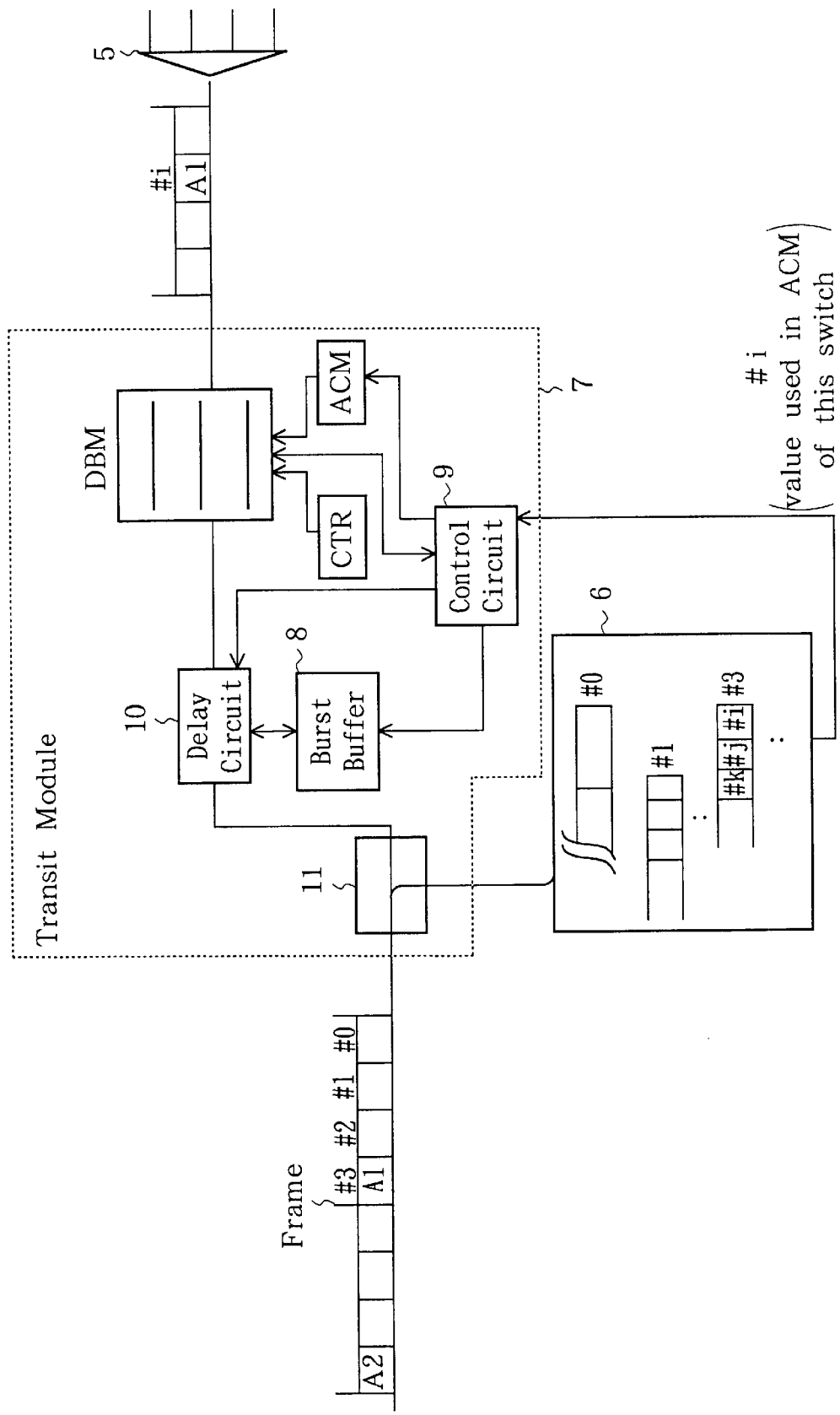
FIG. 3 is a block diagram of the main parts of a transit switch.

FIG. 3 is a block diagram of the main parts of transit switches TS-1 and TS-2. These transit switches each comprise: header look-up module 6 which looks at the header of a packet arriving written in a time slot, said header carrying the aforesaid routing information; transit module 7 which, in accordance with the header found by header look-up module 6, relocates the packet in a time slot corresponding to the routing information written in the header; and demultiplexing module 5 which separates the output time division multiplex highway of transit module 7 into individual output lines. Transit module 7 comprises data buffer memory DBM, sequential counter CTR, address control memory ACM, burst buffer 8, control circuit 9 and delay circuit 10, and further comprises data-copying module 11 which copies the data input to transit module 7 and outputs a copy to header look-up module 6.

In this embodiment the routing information is time slot switching information which relates to the order in which a time slot is relocated when a packet is transferred through STM network 1. Namely, this relocation order indicates the order in which a time slot is to be relocated at transit switches TS-1 and TS-2 and at local switch LS-2 serving terminal TE-2.

The basic operation of this embodiment will now be explained.

An IP packet transferred from terminal TE-1 is given time slot switching information, which serves as routing information, by receiving module 2 in local switch LS-1. Namely, receiving module 2 looks up table 3 to obtain the time slot switching information which serves as routing information that will enable the packet to reach local switch LS-2, this being the local switch serving terminal TE-2 which is the destination of the IP address contained in the IP packet. Time slot switching information corresponding to IP addresses is recorded in advance in table 3.

Thus a header carrying time slot switching information is added to the IP packet, which is then input to transmitting module 4. At the same time, information relating to the outgoing route from local switch LS-1 is transferred to control circuit 9, which attempts to transfer data in accordance with this outgoing route information. Namely, control circuit 9 ascertains whether a certain specified time slot is idle or not by monitoring data buffer memory DBM, and if the desired time slot is not idle, it temporarily stores the packet to be written in this slot in burst buffer 8. If the desired time slot subsequently becomes available, control circuit 9 inputs the packet, which has been temporarily stored in burst buffer 8, to data buffer memory DBM via delay circuit 10. Delay circuit 10 loads the packet into the desired time slot by compensating for the delay introduced by control circuit 9. Writing to data buffer memory DBM is carried out using sequential addresses output by sequential counter CTR, and reading from DBM is carried out using the output of address control memory ACM. Switching of time slots is accomplished by altering the read order.

As shown in FIG. 3, transit switches TS-1 and TS-2 use data-copying module 11 to copy the packet arriving in each time slot and input it to header look-up module 6. By virtually regenerating the input packet, header look-up module 6 can obtain the header contained therein, said header having the time slot switching information written in it. The recovered time slot switching information is transferred to control circuit 9. Subsequent operations are the same as those of local switch LS-1, comprising monitoring data buffer memory DBM and temporarily storing a packet in burst buffer 8 if an idle time slot is not available, and so forth. The same operations as at transit switches TS-1 and TS-2 take place at local switch LS-2 serving destination terminal TE-2 as well, whereby the packet is transferred to terminal TE-2.

Figure 4:
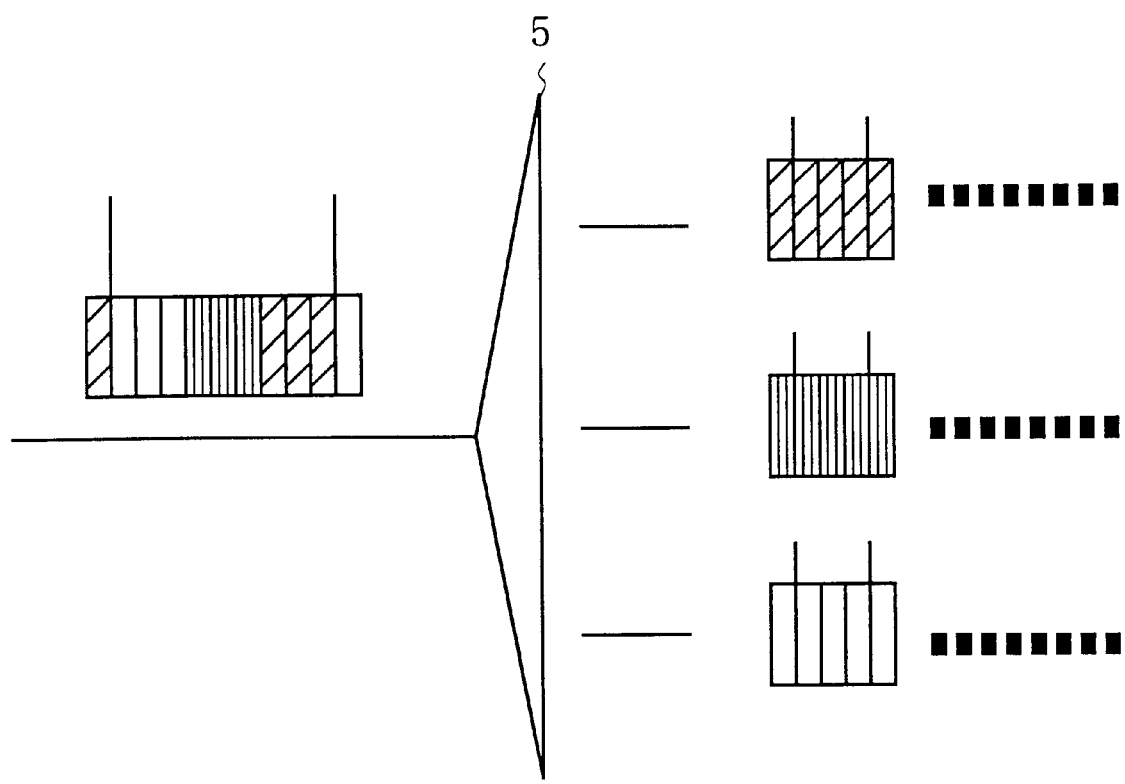
FIG. 4 serves to explain routing using time slot switching information.

Routing using time slot switching information will now be explained with reference to FIG. 4. The data on the output line of transmitting module 4 and transit module 7 is time division multiplexed, and when routing to a certain output line, one of the time slots allocated to that output line has to be selected. Demultiplexing module 5 therefore separates the time slots of the time division multiplex which is input from the highway into fixedly corresponding output lines. The relation between time slot position and output line number is semi-fixed, so that although the slot switching carried out by transmitting module 4 and transit module 7 is determined for each connection, the relation between time slot position and output line number at demultiplexing module 5 is set each time a link is established. In this, demultiplexing module 5 is like a cross-connect.

Thus, because time slot switching information is read from a packet by transit switches TS-1 and TS-2 and local switch LS-2, and the packet is relocated in a prescribed time slot, a dedicated connection does not have to be set up in advance. When transit switches TS-1 and TS-2 and local switch LS-2 receive a packet, the data can be transferred on a link-by-link basis by temporarily holding a time slot to carry the packet. Here, "temporarily" means while a switch is transferring the burst. A connection is therefore maintained only during data transfer, and is released when the transfer is completed.

As a result, links can be established rapidly and take up network resources only during periods of data transfer. At other times they are released. In comparison with ATM-based data transfer, in which 5 bytes of a 53 byte cell are overhead, embodiments of the present invention do not require such overhead. Moreover, since in the present invention there are no problems of jitter and no cell loss, assembling packets at the receiving end is easy.

The present invention can thus provide STM connections dynamically, on the basis of an STM trunk network based on the IP addresses used in data communications. This has previously only been possible in the case of simple leased lines. It follows that this invention can be used to implement a circuit-switched network in which there is little delay or overhead.

Figure 5:
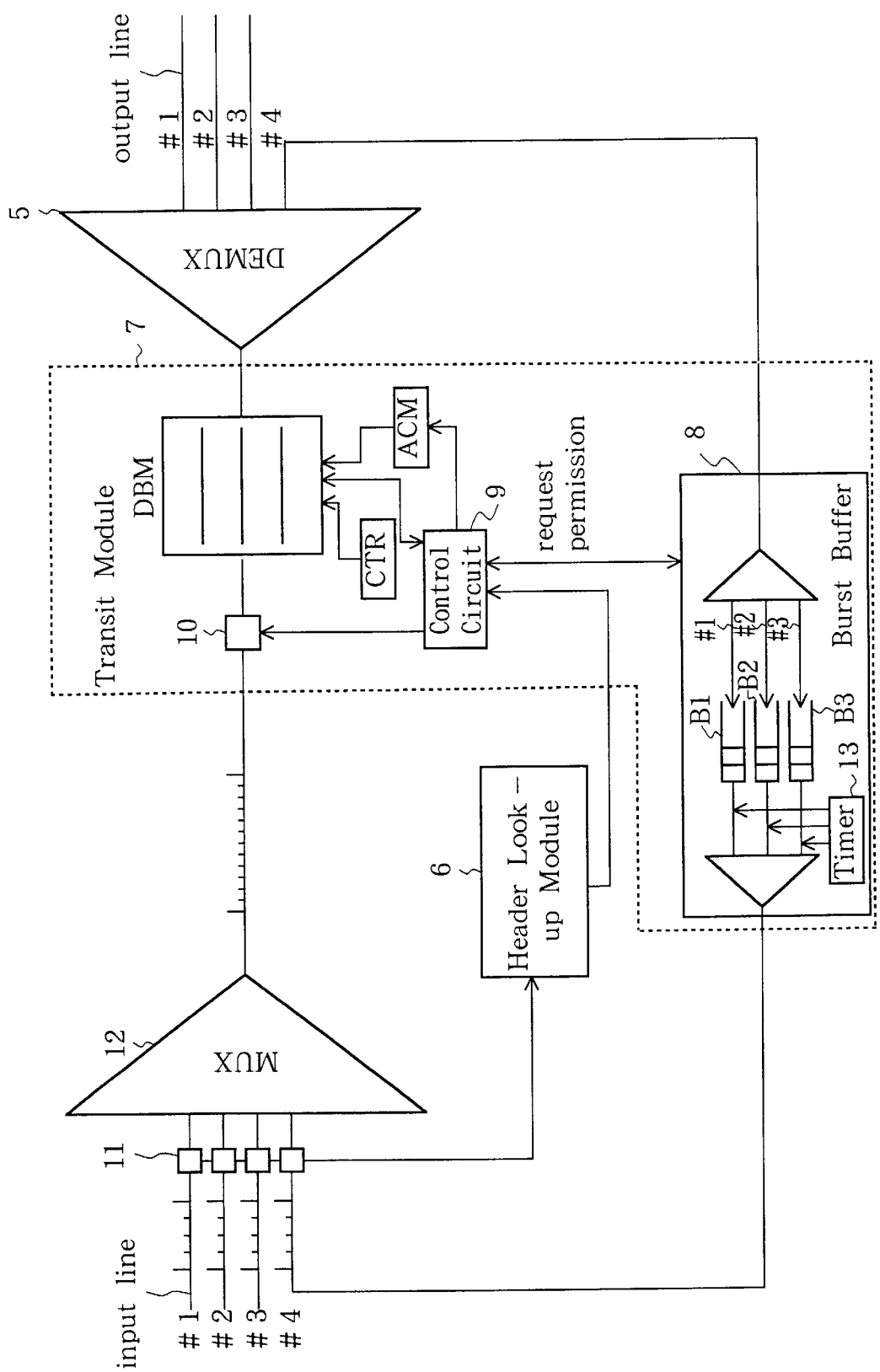
FIG. 5 serves for a detailed explanation of the configuration of a burst buffer.

FIG. 5 serves for a more detailed explanation of the burst buffer. Although transit switches TS-1 and TS-2 are on the whole as described with reference to FIG. 3, in practice they serve a plurality of input lines and output lines, as shown in FIG. 5. Here it will be supposed that there are four input lines #1–#4 and four output lines #1–#4. Packets transferred on input lines #1–#4 by being carried in time slots are copied by data-copying modules 11 and input to header look-up module 6, and at the same time are input to multiplexing module 12 and multiplexed. Because four input lines #1–#4 were assumed, if four time slots are transferred to each input line #1–#4, sixteen time slots will be output from multiplexing module 12. Subsequent operations are as previously explained, and data output from transit module 7 is separated into four output lines #1–#4 by demultiplexing module 5.

In the example shown in FIG. 5, output line #4 is connected to the input of burst buffer 8, and the output of burst buffer 8 is connected to input line #4 of multiplexing module 12. As a result, packets for output lines #1–#3 can be directed to output line #4 when there are no idle time slots available for them, and can be temporarily stored in burst buffer 8. In this example, packets for output lines #1–#3 can be stored in respectively assigned buffers B1–B3.

FIG. 6 shows the configuration of table Ti provided in control circuit 9 for ascertaining whether a specified time slot is idle. Control circuit 9 ascertains which time slots are idle by monitoring data buffer memory DBM, and records its findings in table T1.

At fixed intervals timer 13 in burst buffer 8 queries control circuit 9 regarding the idle time slot situation. Control circuit 9 looks up table T1 and replies to this query. If a desired time slot has become available, a packet for this time slot, this packet having been stored in a buffer B1–B3, is output to input line #4 of multiplexing module 12. This packet is then processed in the same manner as a newly input packet, and is output after being put in a time slot corresponding to a desired output line #1–#3.

FIG. 7 shows another example of the configuration of the table for ascertaining whether a specified time slot is idle. This table provides reservation table T2 in addition to the table shown in FIG. 6. In this case, control circuit 9 ascertains from what has been recorded in reservation table T2 whether a packet temporarily stored in burst buffer 8 is a packet for which a particular time slot has been requested. In this case, timer 13 shown in FIG. 5 is not required, and when a reserved time slot becomes available, control circuit 9 can rapidly give the buffer permission to transmit a packet waiting for this time slot.

Figure 8:
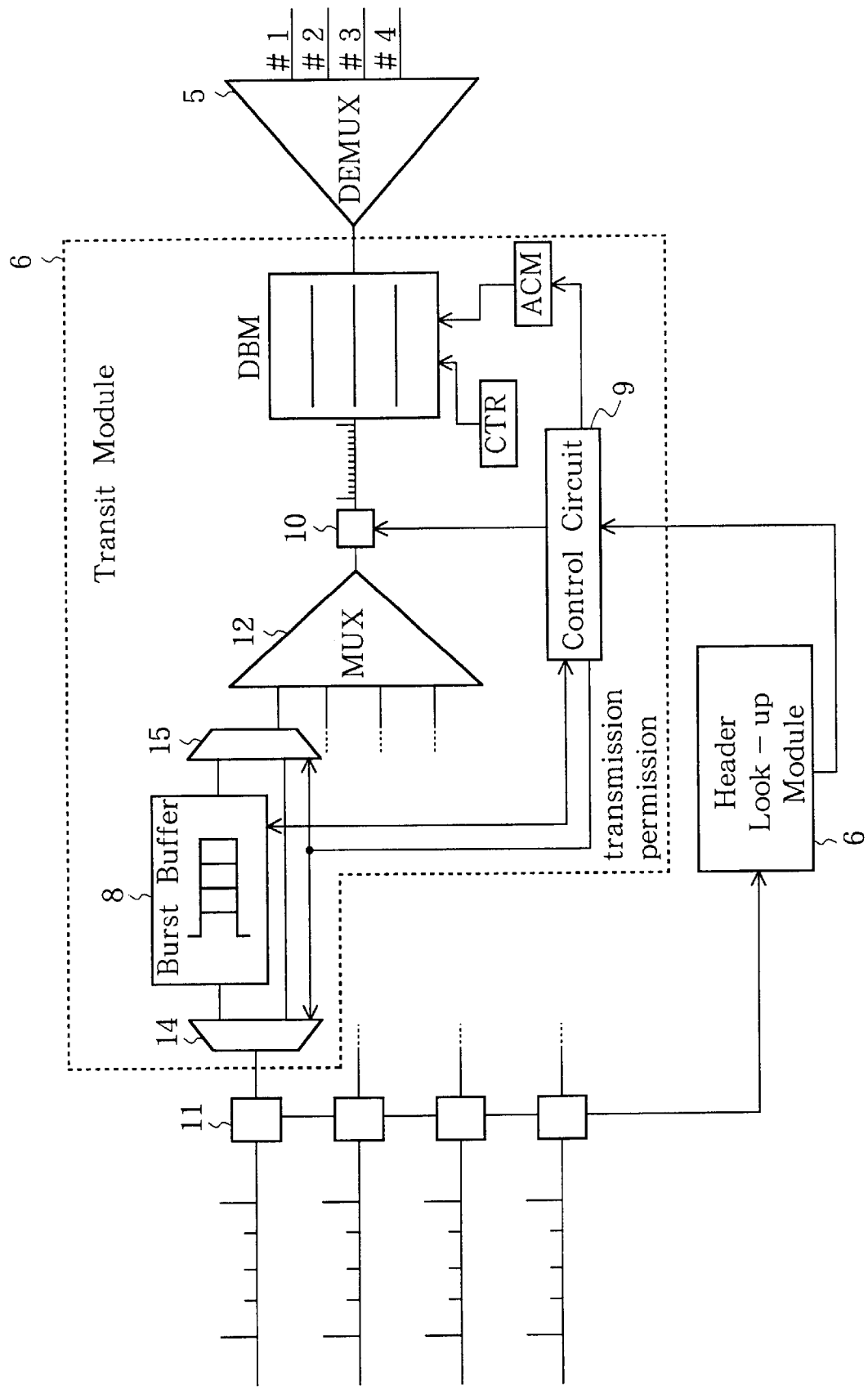
FIG. 8 gives an example of a configuration in which a burst buffer is provided in each input line.

FIG. 8 is an example of providing a burst buffer 8 for each input line #1–#4. For clarity, only the burst buffer provided for input line #1 is illustrated, and the other burst buffers 8 provided for input lines #2–#4 have been omitted from the drawing.

If one output line is connected to the input of burst buffer 8 as in FIG. 5, there is a possibility that packets will be discarded if there is a concentration of packets to be written to burst buffer 8 via this output line. Furthermore, if the traffic on a particular input line overloads, it will be difficult to write packets from another input line to burst buffer 8. As opposed to this, because the configuration illustrated in FIG. 8 provides a separate burst buffer 8 for each input line #1–#4, it can avoid packet discard due to traffic concentrations.

Control circuit 9 of FIG. 8 monitors the idle time slot situation and if an input packet has time slot switching information specifying a time slot corresponding to an output line on which there are no idle slots, the packet is input to burst buffer 8 by switching over selector 14. If the time slot requested for the packet stored in burst buffer 8 become available, control circuit 9 switches over selector 15, thereby causing the packet to be output from burst buffer 8.

In this embodiment, in order to control the transfer of packets stored in burst buffer 8, time slot management table T1 provided in control circuit 9 and timer 13 provided in burst buffer 8 can be utilized in the same way as in the embodiment illustrated in FIG. 5 and FIG. 6. Alternatively, packet transfer from burst buffer 8 can be controlled by providing control circuit 9 with reservation table T2 in addition to time slot management table T1, as shown in FIG. 7.

In the foregoing embodiments, because time slot switching information is generated by a source edge node, a connection is set up regardless of the availability of time slots on the various links comprising the route, with the result that it may be impossible to acquire a time slot at a particular link. In this case the connection setup ends up being abandoned en route. Moreover, because abandoning a connection setup means that a fresh setup request has to be made all over again at the source side, the end result is that packet transfer delay increases. On the other hand, even if a specified time slot cannot be acquired at a particular link, other time slots may be idle on the output line from which a packet is to be forwarded.

It is therefore preferable to search, in accordance with the address information of a packet, for an idle time slot on the output line corresponding to this address, and to write the packet in this time slot. To do this, the output line number carried in the time slot switching information prepended to the head of the packet is extracted. Next, this output line number can for example be input to a hash function device, whereby a time slot number is output. At the same time, an operation repetitions counter for the hash function device starts to increment. The value reached by this counter is used when computing the hash function, and each time the hash function is computed a different time slot number is output. The time slot number output in this manner is then used as a key for searching a time slot state table to establish whether or not that time slot is idle. If it is idle, the time slot is allocated. If it is not idle, the procedure described above is repeated. Because the hash function which is computed makes use of the value reached by an operation repetitions counter, the same time slot number will not be successively output. This procedure is repeated until an idle time slot is found, or until the number of computations of the hash function reaches an upper limit. If no idle time slot is found when the number of computations has reached the upper limit, no time slot can be allocated.

Alternatively, the time slots allocated to each output line can run consecutively. In this case, a table of the correspondence between output line numbers and time slots is searched using a time slot number. The number of the first time slot associated with each output line number is recorded in this table. Because the first time slots associated with a given output line number and with the succeeding output line number can be found from this table, a successive check can be made of whether the time slots between these two first time slots are idle.

Alternatively, to remove the restriction that the time slot numbers allocated to each output line run consecutively, the time slot numbers given in the table showing the correspondence between output line numbers and time slot numbers can comprise a plurality of pairs, the first number of each pair being a first time slot number and the second number being the time slot number following the last time slot number. This enables the availability of the time slots between a first time slot number and the time slot number following the last time slot number to be successively checked.

Alternatively, instead of using a hash function or a table to make successive searches for an idle time slot, an idle time slot can be found by a single search. To achieve this, unused time slots among the group of time slots allocated to each output line are connected in a chain, and pointers to the head and tail of these chains are held in a table giving the correspondence between output line numbers and time slot numbers. Then, when an output line number is given, the table is searched and the first time slot in the chain of unused time slots from among those allocated to the output line in question is allocated. When a time slot is released, it is connected to the chain of unused time slots.

Embodiments of these methods for finding idle time slots will now be described with reference to FIGS. 9 to 17.

FIG. 9 shows an example of the table provided in control circuit 9, and illustrates a first embodiment for searching for an idle time slot. This table T2 stores, in respective correspondence, output line numbers corresponding to destinations, the number of each time slot, and information relating to whether or not there is an idle time slot corresponding to a given time slot number. Control circuit 9 looks up this table T2 in accordance with the destination of a packet and searches for an idle time slot.

To do this, the output line number carried in the time slot switching information prepended to the head of the packet is extracted. An idle time slot can be identified by providing each time slot with an identifying bit which can signify that the time slot is already being used. Accordingly, the output line which appears in the time slot switching information is selected, and the time slot used is the first time slot in which the identifying bit has not been set.

Figure 10:
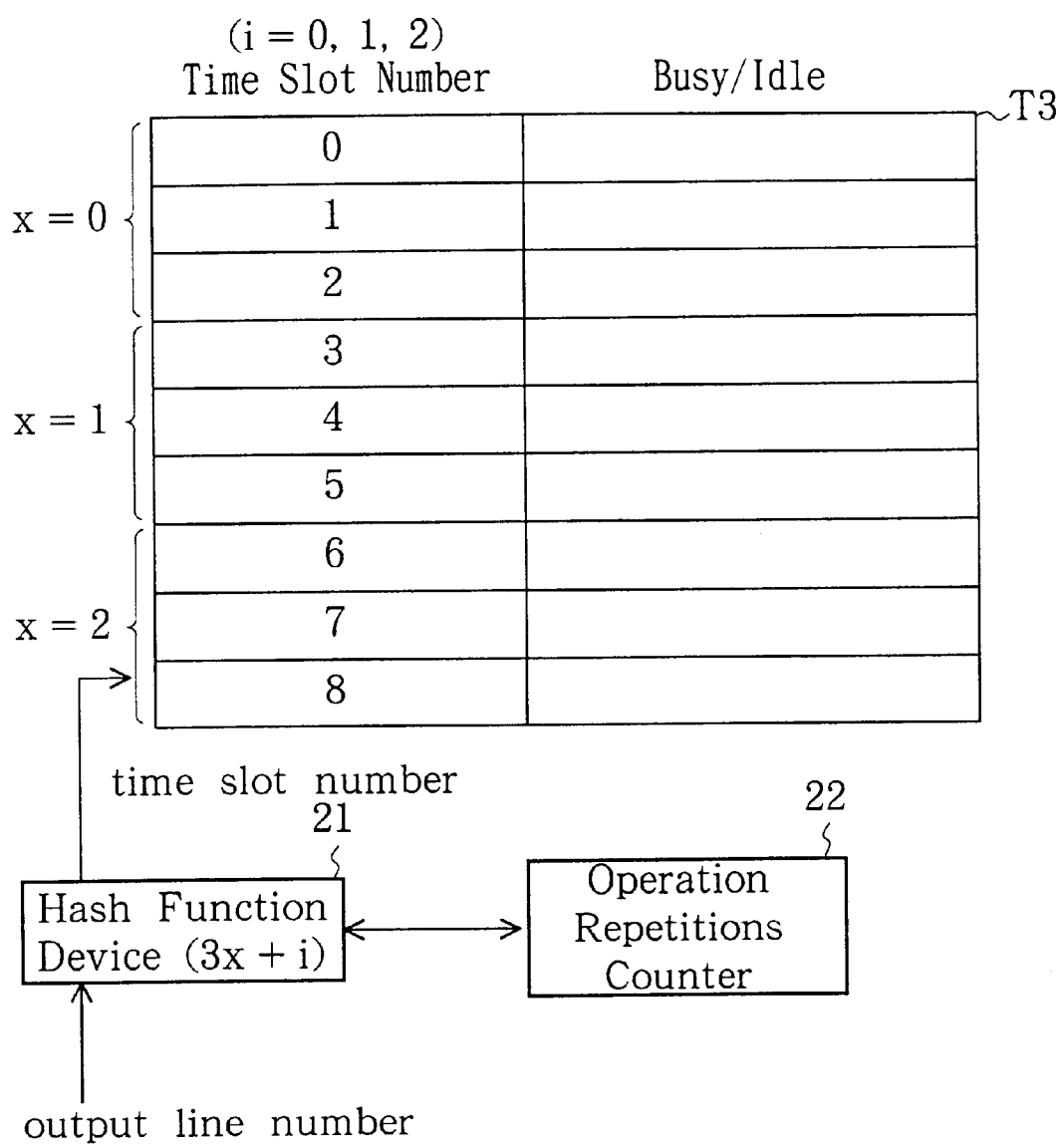
FIG. 10 is a block diagram of an example of the configuration of a control module for finding an idle time slot.

FIG. 10 is a block diagram of the inside of control module 9, and illustrates a second embodiment for searching for an idle time slot. According to this configuration, control module 9 is provided with table T3 showing the state of the time slots, hash function device 21, and operation repetitions counter 22. First of all, an output line number is input to hash function device 21. Operation repetitions counter 22 simultaneously starts to increment. The value reached by this counter is used to compute the hash function. Let it be assumed by way of example that there are three output lines and that each comprises K slots. Letting x stand for the output line number, the hash function is defined as $3x+i$, where i is the value reached by operation repetitions counter 22. The counter has an initial value of 0 and takes successive values up to K minus 1. In other words, the K slots given by $3x+i$ are allocated to output line number x, where i ranges from 0 to K−1. In the present example, x and i can take any of values 0, 1 and 2. The availability of time slots selected in this way is successively examined, and information relating to an idle time slot is reported to address control memory ACM. If there are no idle time slots, this is reported.

Figures 11, 12:
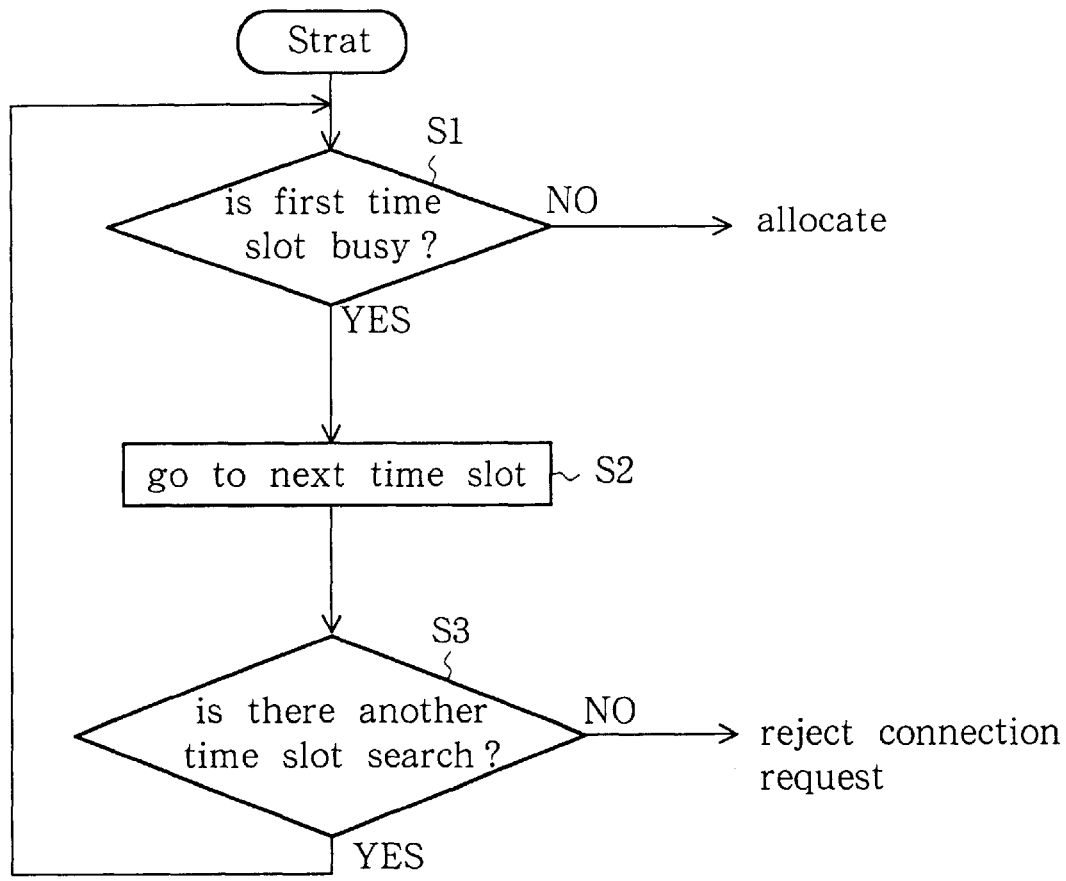
FIG. 11 is a flowchart of a time slot allocation procedure.
FIG. 12 shows an example of a table provided in the control module for finding an idle time slot.

FIG. 11 is a flowchart of a time slot allocation procedure. First of all, a table is searched for the first time slot which can be allocated to the output line in question, and if this is busy (i.e., is not idle) (S1), the next time slot is found (S2). This searching is repeated until an idle time slot is found, or until there are no further time slots to check (S3).

FIG. 12 shows an example of the table provided in control module 9, and illustrates a third embodiment for searching for an idle time slot. FIG. 13 shows the resulting relation between time slot numbers and output line numbers. According to this configuration, the time slot numbers allocated to each output line run in numerical order, and these sequences are themselves consecutive with increasing output line number. Table T4 shown in FIG. 12 holds the first of the time slot numbers allocated to each output line, with the resulting correspondence given in FIG. 13. Because the first time slots associated respectively with a given output line number and the succeeding output line number can be found from table T4 of FIG. 12, the procedure illustrated in FIG. 11 can be used to successively examine whether the time slots between these two first time slots are idle or not. Accordingly, information relating to an idle time slot can be reported to address control memory ACM in the same manner as in the embodiment described with reference to FIG. 10 and FIG. 11. Otherwise, it is reported that the connection request cannot be met.

Figures 15, 16:
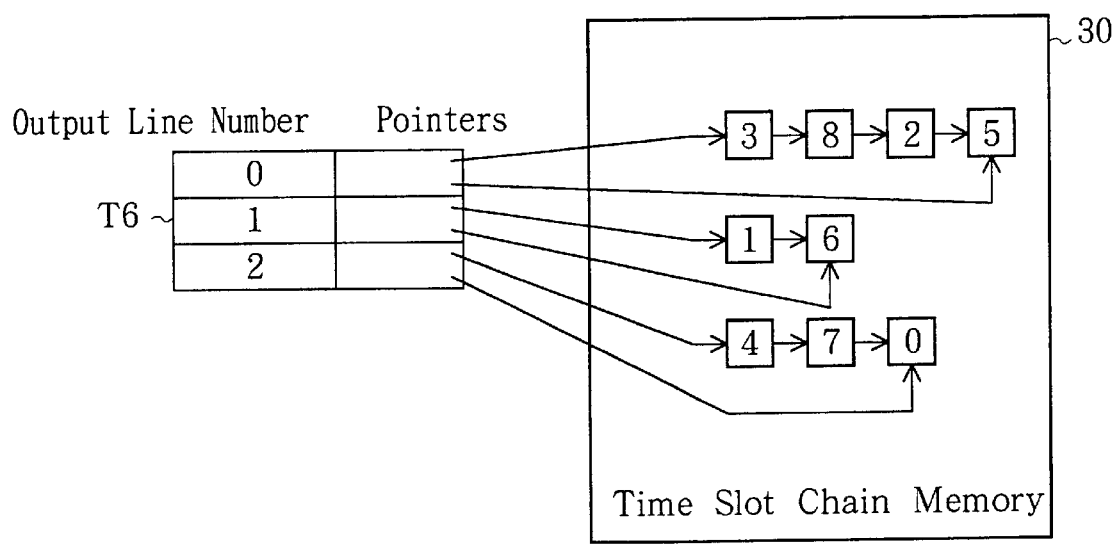
FIG. 15 shows a relation between time slot number and output line number.
FIG. 16 shows a table provided in the control module for finding an idle time slot, and an example of the situation in the time slot chain memory.

FIG. 14 shows an example of the table provided in control module 9, and illustrates a fourth embodiment for searching for an idle time slot. It also shows the relation between output line numbers and time slot numbers. The embodiment described with reference to FIG. 10 and FIG. 11 had the restriction that the time slot numbers allocated to the output lines run in numerical order along with the output line numbers, whereas the embodiment depicted in FIG. 14 and FIG. 15 has no such restriction. Table T5 giving the correspondence between output line number and time slot number has pairs of time slot numbers, the first number of each pair being the first time slot number of a given group, and the second of the pair being the time slot number following the last time slot number of the same group. The time slots allocated to each output line are grouped, and in each group the time slot numbers run in numerical order. FIG. 14 illustrates a table in which is recorded the correspondence between output line numbers and time slot numbers, and the resulting relation between time slot numbers and output line numbers is shown in FIG. 15. By using table T5 shown in FIG. 14 to successively check the status of time slots in accordance with the procedure depicted in FIG. 1, information relating to an idle time slot can be reported to address control memory ACM in the same manner as in the embodiment described with reference to FIG. 10 and FIG. 11. Otherwise, it is reported that the connection request cannot be met.

Figures 17, 18:
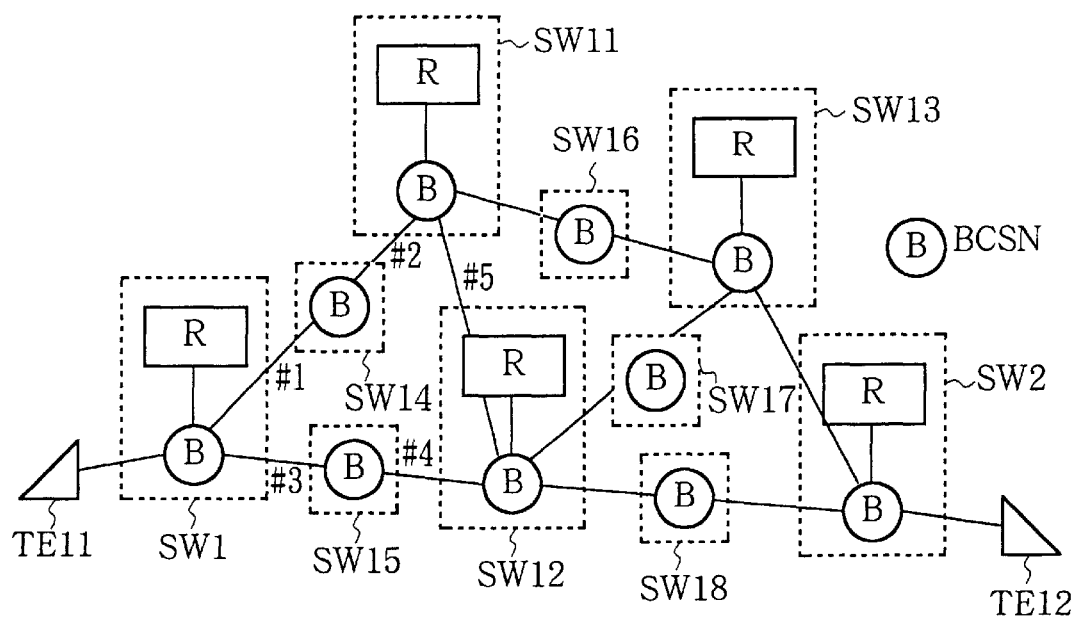
FIG. 17 shows a relation between time slot number and output line number.
FIG. 18 shows an example of the configuration of a circuit-switched network in which each switch determines the next switch.

FIG. 16 shows an example of a table and time slot chain memory provided in control module 9, and illustrates a fifth embodiment for searching for an idle time slot. FIG. 17 shows the corresponding relation between time slot number and output line number. In the embodiments described above it was necessary to search a table sequentially in accordance with the procedure of FIG. 11 in order to obtain an idle time slot, but in this fifth embodiment an idle time slot can be obtained by means of a single search. The unused time slots in the groups of time slots allocated to each output line are connected in a chain. Table T6, in which the correspondence between output line number and time slot number is recorded, therefore holds pointers to the head and tail of these chains of unused time slots from among those allocated to the output lines. As shown in FIG. 16, time slot chain memory 30 uses pointers to connect the time slot numbers in chains. According to this embodiment, when an output line number is given, table T6 is searched and the time slot at the head of the chain of unused time slots allocated to the output line in question is allocated. When a time slot is released, its time slot number is connected to the chain of unused time slots. Thus once table T6 has been prepared, the mapping from time slot numbers to output line numbers can easily be found.

As has been explained above, this invention has some flexibility in writing a packet in an idle time slot, this being achieved by searching in accordance with the packetÕs destination information for an idle time slot in the output line for that destination, and then writing the packet in that time slot. This helps to suppress the discarding of connection setup requests, and to reduce packet transfer delay.

In the foregoing embodiments, discarding of data can be suppressed by searching for an idle time slot, but because the route between switches is fixed, the data has to wait at a switch on the route if there are no idle time slots available between that switch and the next on the route. According to the attributes of the data, it may end up being discarded while waiting, or the delay incurred in waiting may be a factor resulting in the data ending up being discarded even if it does finally arrive at its destination. This problem becomes acute if the configuration of routes grows more complicated as a result of an increase in the number of transit switches, or if one route serves as a common route to a large number of destinations. Accordingly, given a configuration in which a plurality of switches are interconnected, each switch can be provided with a table in which information relating to a plurality of routes to desired destinations is recorded in advance, so that when data are to be transferred, rather than all the time slot switching information up to the final destination of that data being determined by the switch at the entrance to the burst circuit-switched network, each switch can determine the switch to which the data should next be transferred, by looking up the state of the time slots at that point in time. As a result, the latency of data transfer at the switches can be shortened and the amount of discarded data can be reduced. Embodiments of this sort will now be described with reference to FIGS. 18 to 23.

FIG. 18 shows an example of the configuration of a circuit-switched network in which each switch determines which switch data will be transferred to next. This embodiment comprises source switch SW1 serving source terminal TE11, destination switch SW2 serving destination terminal TE12, and a plurality of transit switches SW11–SW18 disposed between switches SW1 and SW2. A plurality of routes are established between switches SW1 and SW2. The configuration of switches SW1, SW2 and SW11–SW18 is basically similar to that described with reference to FIG. 2 or FIG. 3, but in this embodiment the configuration of the switches is represented as comprising burst circuit-switching node B and routing control module R, these setting up connections by specifying time slot switching information. Routing control module R corresponds to some of the functions of control circuit 9 in FIG. 2 or FIG. 3, and burst circuit-switching node B corresponds to the remaining parts of the switch. In FIG. 18 the routing control module R is shown only for switches SW1, SW2, SW11, SW12 and SW13 positioned at route branch points.

Figures 19, 20:
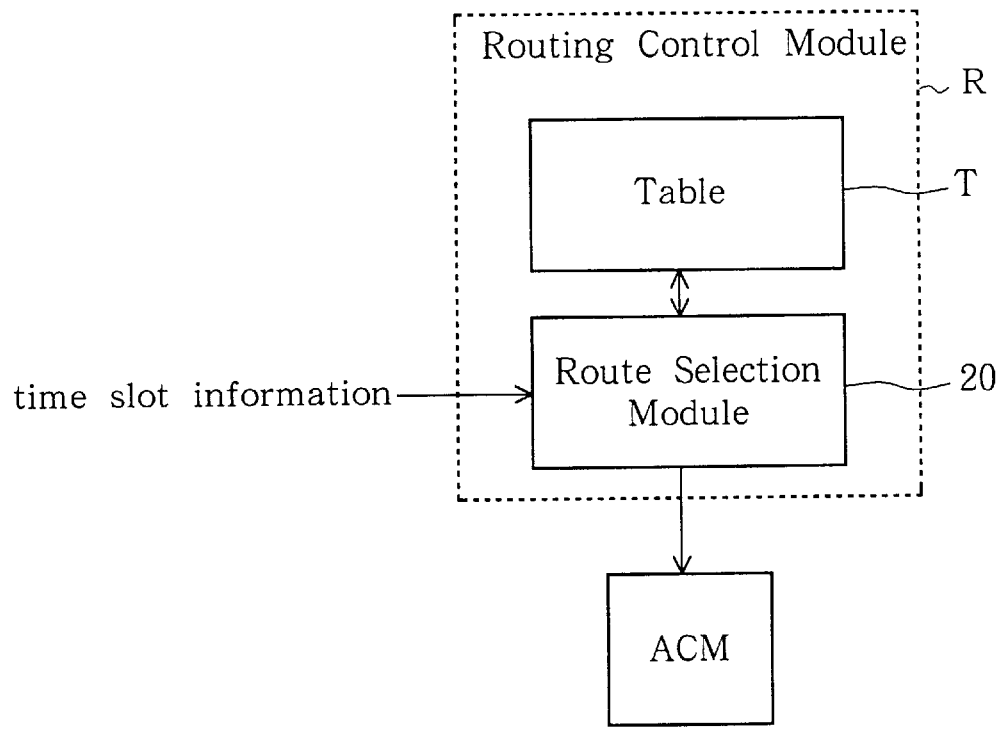
FIG. 19 shows an example of the configuration of a routing control module.
FIG. 20 shows an example of the configuration of table T7 in FIG. 19.

FIG. 19 shows an example of the configuration of routing control module R, which comprises table T7 in which is recorded information mapping a plurality of routes to time slots to be allocated, and route selection module 40 which looks at table T7 and selects some of the plurality of routes in accordance with the destination information of data which has arrived. Route selection module 40 preferentially selects routes on which there are few transit switches en route to a given destination.

FIG. 20 shows an example of the configuration of table T7, in which are recorded, in correspondence with a final destination address (DA), a next switch and the time slot switching information required to reach this switch. If there are a plurality of routes by which the next switch can be reached, information relating to all of these routes is recorded in table T7, in which case the number of transit switches is indicated for each of these routes.

For example, given data from source terminal TE11 directed towards destination terminal TE12, "TE12" will be recorded as the final destination address (DA). If the table belongs to switch SW1, "SW11, SW12" is recorded as the next switch. Both "SW1–SW15–SW12" and "SW1–SW14–SW11–SW12" are possible routes from switch SW1 to switch SW12, and this information is also noted. Furthermore, as time slot switching information there is recorded "#1, #2" corresponding to switch SW11, "#3, #4" corresponding to switch SW12, and "#5" corresponding to the hop between switch SW11 and switch SW12.

When a packet arrives from source terminal TE11, switch SW1 at the entrance of this circuit-switched network extracts the final destination address from the packet. It searches table T7 of routing control module R on the basis of this final destination address and obtains switch SW11 and switch SW12 as the next switch to which it has to transfer the packet. Likewise, it obtains the time slot switching information required to reach switch SW11 or switch SW 12. Switch SW1 then sets this time slot switching information in the address control memory of burst circuit-switching node B. It also writes the time slot switching information in the appropriate time slot on the output highway of burst circuit-switching node B, thereby setting up a connection to next switch SW11 or SW12. Switches SW14 and SW15 are respectively present as passive nodes between switch SW1 and next switch SW11, and between SW1 and SW12, and the address control memory of these switches SW14 and SW15 is set automatically by hardware, using the time slot switching information written in the relevant time slot.

Let it be assumed that SW1–SW15–SW12 and SW1–SW14–SW11–SW12 are the possible routes from SW1 to next switch SW12. Both of these routes will therefore be recorded in table T7. Route selection module 40 of switch SW1 first of all selects the route with the fewest transit switches as the first candidate. In this case, the route SW1–SW15–SW12 has the fewest transit switches and is therefore the first candidate route. However, if the time slot at switch SW1 corresponding to this route is busy, route selection module 40 selects SW1–SW14–SW11–SW12, which is the next candidate route. If there is an idle time slot corresponding to the next candidate route, the data is transferred to switch SW12 via the next candidate route. Transit switches SW11 and SW12 both perform the same processing as switch SW1, and thereafter the data is transferred to the final destination in similar manner.

Figure 21:
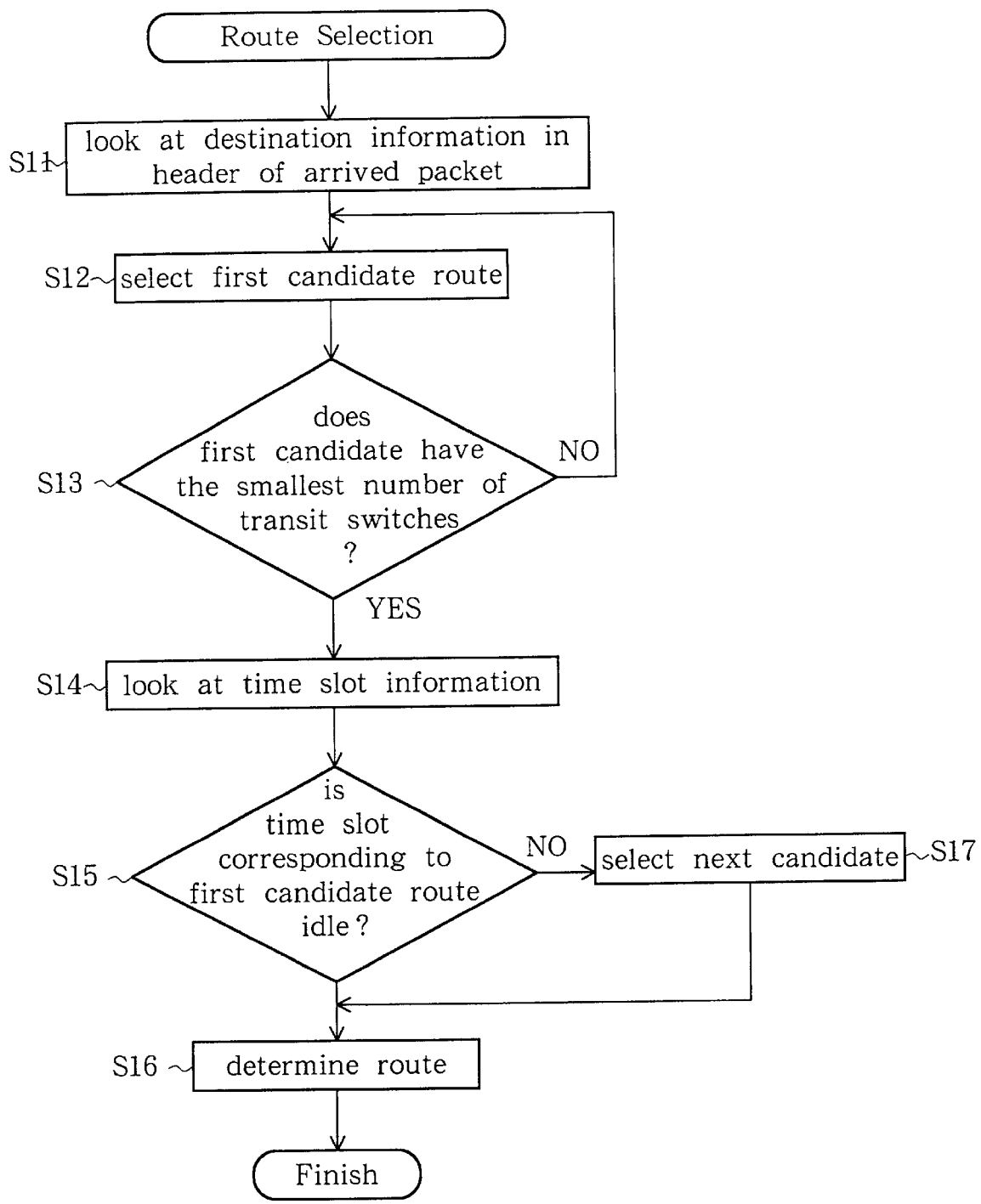
FIG. 21 is a flowchart of the operation of a route selection module.
Figure 22:
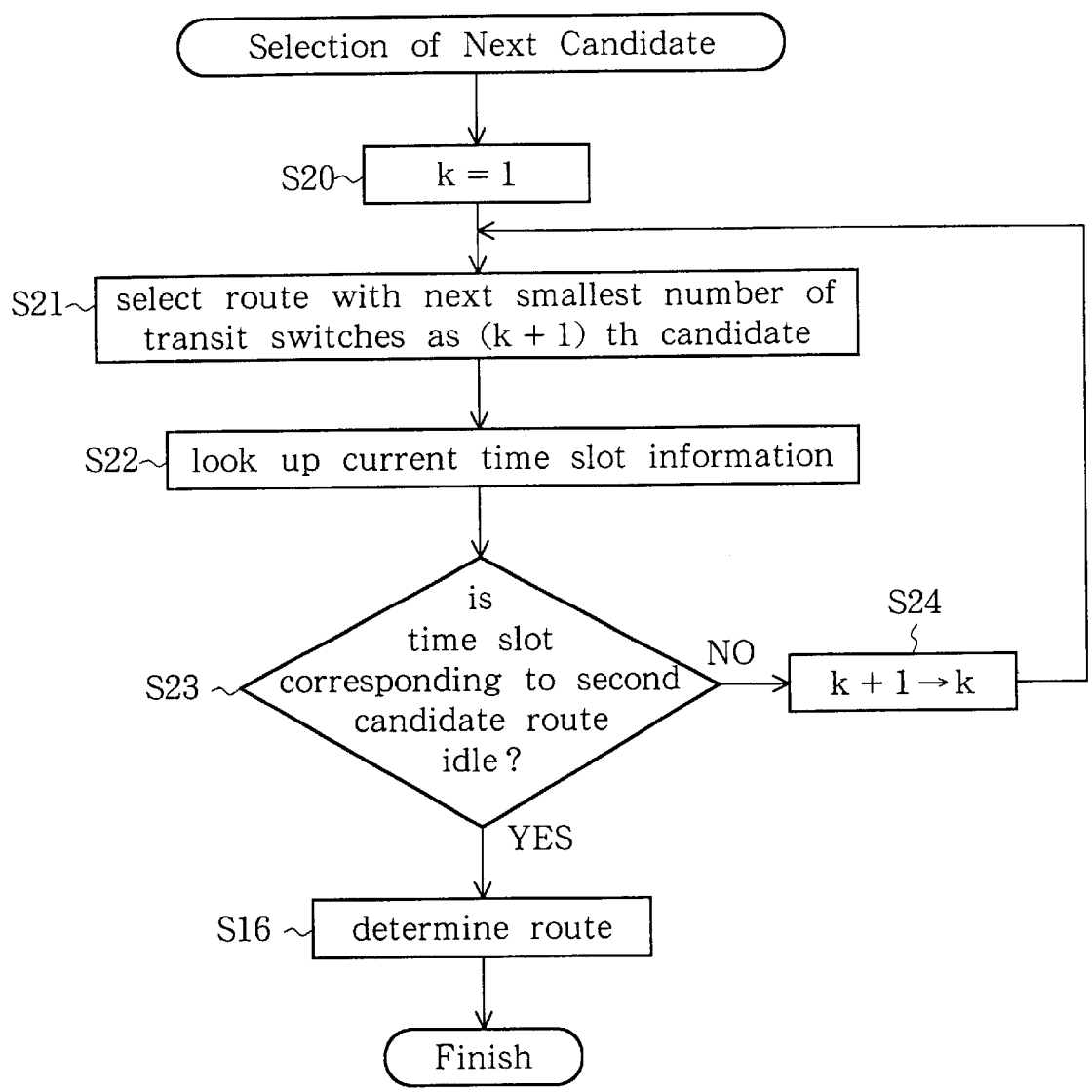
FIG. 22 is a flowchart of the operation of the next candidate selection.

FIG. 21 and FIG. 22 are flowcharts of the operation of route selection module 40. Route selection module 40 first of all looks at the destination information written in the header of a packet which has arrived (S11) and specifies the final destination. Next, it looks at table T7 and extracts the routes to this destination. It then selects one of these routes as the first candidate (S12), and decides whether or not this first candidate is the route with the smallest number of transit switches (S13). Next, it looks at the time slot information at this point in time (S14) and if the time slot corresponding to this first candidate route is idle (S15), it sets this time slot as the slot for transferring the packet (S16). If however the time slot corresponding to this first candidate route is not idle (S15), route selection module 40 selects the next candidate (S17).

As shown in FIG. 22, to select the next candidate, route selection module 40 selects, from the routes to the destination in question, the route with the next fewest transit switches after the first candidate (S21). It then looks at the time slot information at this point in time (S22) and if the time slot corresponding to this second candidate route is idle (S23), it sets this time slot as the time slot for transferring the packet in question (S16). If this second candidate does not have an idle time slot either, a route is determined by successively repeating the procedure described above (S21–S24) for third, fourth and further candidates, as required.

Figure 23:
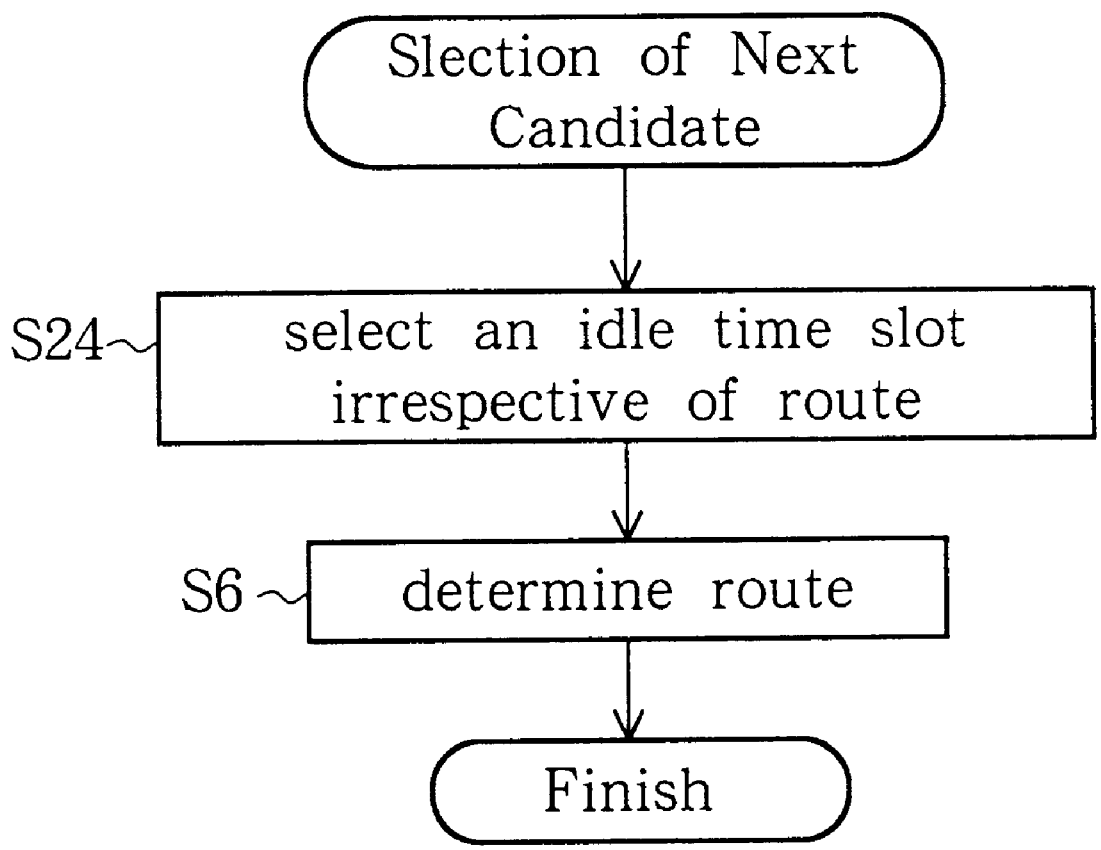
FIG. 23 is a flowchart showing another example of next candidate selection.

Another way of selecting the next candidate is shown in FIG. 23. In this example, the procedure for selecting the next candidate when the time slot corresponding to the first candidate route is not idle is different from the procedure illustrated in FIG. 22. Namely, when a first candidate route has been selected by looking up the destination information in the packet, if the time slot for this first candidate route is not idle, route selection module 40 selects an idle time slot irrespective of route (S24). This generally results in the latency of data at switches SW1, SW2 and SW11–SW13 being shortened. The subsequent data transfer route will sometimes have needlessly many transit switches, but because the data transfer delay due to the data transfer latency at switches SW1, SW2 and SW11–SW12 is greater than the data transfer delay due to the redundant transit switches in the data transfer route, data transfer delay can be shortened by this alternative next candidate selection procedure.

In the foregoing explanation, routing using time slot switching information has been described, but this embodiment is likewise applicable to routing using an E.164 address. Namely, in a circuit-switched network where routing is performed using an E.164 address, routes are allocated in accordance with the E.164 address, a plurality of routes are established in advance for this E.164 address at switches SW1, SW2 and SW11–SW13, and the route with the smallest number of transit switches in the data transfer is selected.

Figure 24:
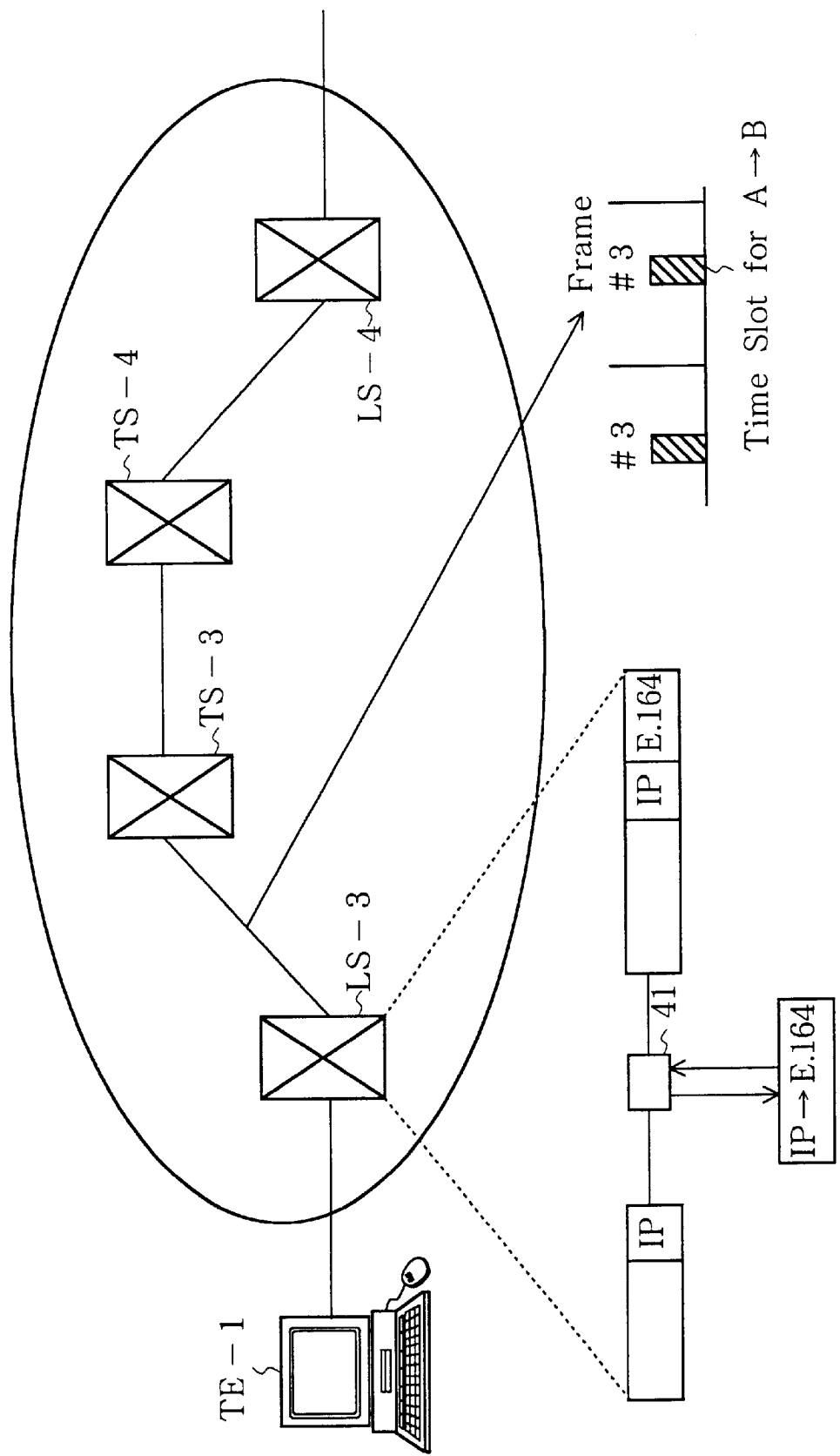
FIG. 24 shows an example of the configuration of a circuit-switched network in which routing is carried out using E.164 addresses.

FIG. 24 shows an example of the configuration of a circuit-switched network in which routing is performed using an E.164 address. In this circuit-switched network, routes are allocated between the switches (local switches LS-3 and LS-4, and transit switches TS-3 and TS-4) in accordance with an E.164 address. By writing the data in time slots corresponding to the route specified in accordance with the E.164 address written in the E.164 header, this data is transferred to the desired destination. Namely, in FIG. 24, when an IP packet transmitted from communications terminal TE-1 arrives at local switch LS-3 at the entrance of STM network 1, an E.164 address corresponding to the packet destination written in the IP header is given by control unit 41 provided in this local switch LS-3. This E.164 address is added to the IP header as an E.164 header. Transit switches TS-3 and TS-4 and local switch LS4 can transfer the data to the desired destination by each writing the packet data in a time slot corresponding to the route corresponding to the E.164 address.

This configuration can shorten the data transfer latency at each switch and can decrease the amount of data discarded. This is achieved in similar manner to the examples illustrated in FIGS. 18 to 23, by setting a plurality of routes for reaching a given E.164 address, ascertaining at each switch whether a time slot is currently idle or not, and thereby determining the switch to which the data should next be transferred.

In the foregoing embodiments, if a communication makes use of a plurality of time slots but only some of the time slots can be acquired at a particular link in the route, the order of the packets cannot be preserved during data transfer. If data has been interleaved and only some of the data is transferred, it will end up as meaningless data.

Accordingly, in cases where a communication uses a plurality of time slots but only some of the time slots can be acquired at a particular link in the route, it is preferable to provide means which enables the order of the data written in the time slots to be preserved during communication. Such embodiments will now be described with reference to FIGS. 25 to 32.

Figure 25:
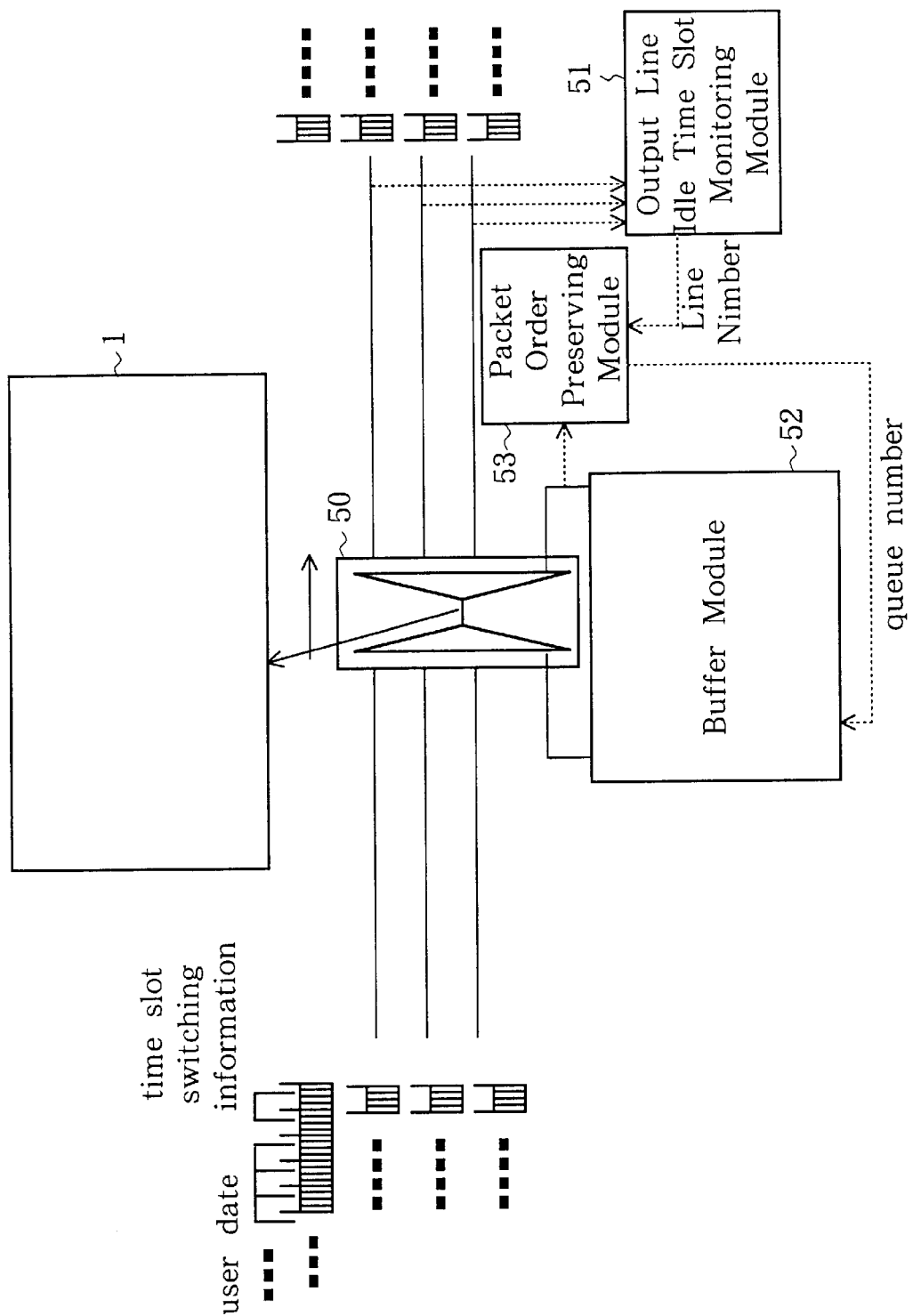
FIG. 25 is a block diagram of a first embodiment in which the order of the data written in time slots is preserved during communication.

FIG. 25 is a block diagram of a first embodiment in which the order of the data written in time slots is preserved during communication. This embodiment comprises: line switching module 50 which implements the functions of the switches illustrated in FIGS. 2 and 3; output line idle time slot monitoring module 51 for monitoring information relating to which time slots are idle; buffer module 52 which, when a specified time slot is not idle, temporarily stores the packet which should be placed in that time slot; and packet order preserving module 53 which, when the result of monitoring by output line idle time slot monitoring module 51 indicates that a specified time slot has become available, reads the corresponding packet from buffer module 52. Buffer module 52 and line switching module 50 are connected by time division multiplex lines, so that information can be communicated between the two modules regardless of the time slot position it is placed in on the line.

Given this configuration, output line idle time slot monitoring module 51 monitors for idle time slots and when an idle time slot becomes available, reports its line number to packet order preserving module 53. Packet order preserving module 53 stores the order in which packets have been stored in buffer module 52 and reads out the packets in accordance with this stored storage order, starting with the first to have been stored. As a result, given an output line on which time slots have become available, buffer module 52 selects the oldest of the packets which have this line as their output destination and outputs the packet to this line.

Figure 26:
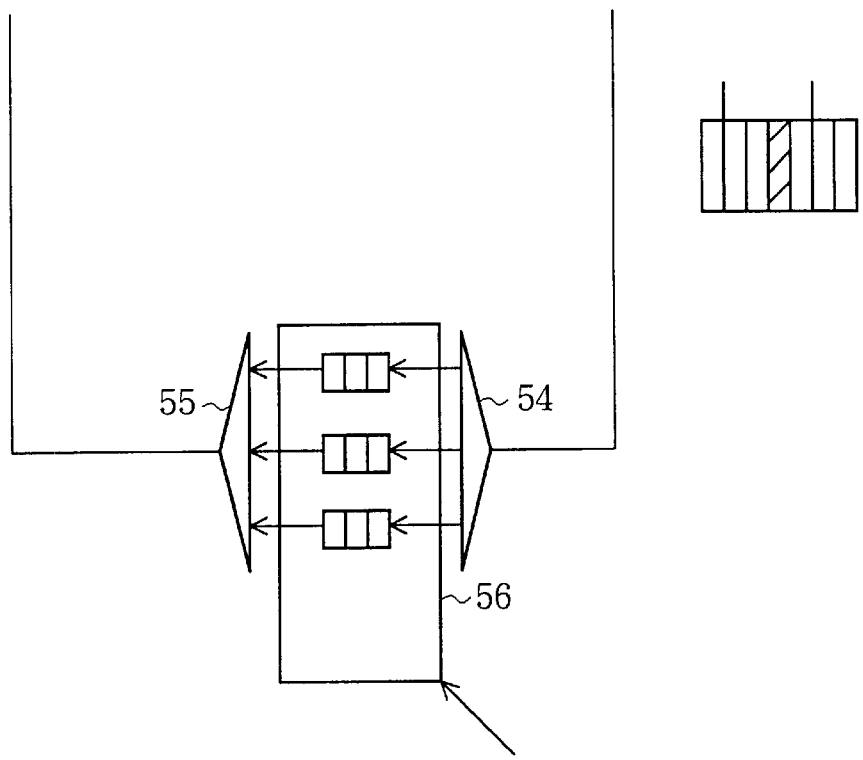
FIG. 26 shows an example of the configuration of the buffer module in FIG. 25.

FIG. 26 shows an example of the configuration of buffer module 52, comprising time division multiplex blocks 54 and 55, and queue generator block 56. Time division multiplex blocks 54 and 55 separate the time division multiplex channels connecting buffer module 52 and line switching module 50, in accordance with the order of the time slots. When a packet to be transferred to buffer module 52 is detected, queue generator block 56 forms queues and generates a correspondence between queue numbers and time slots.

Figure 27:
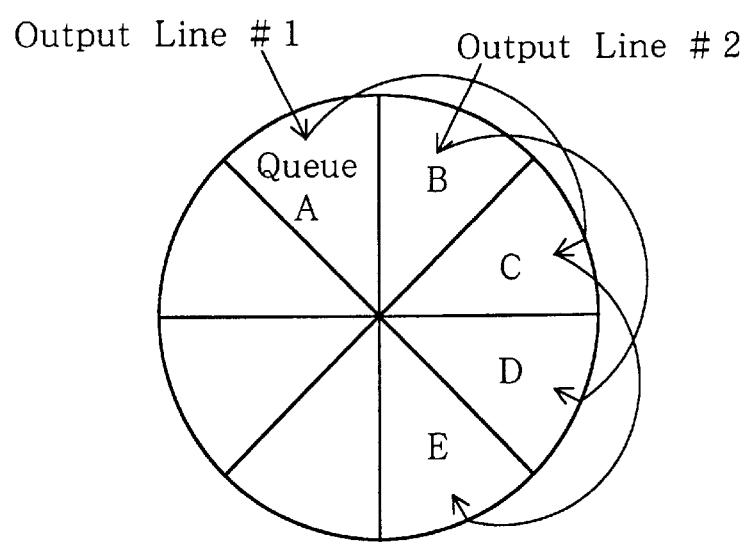
FIG. 27 shows an example of the configuration of a packet order preserving module.

FIG. 27 shows an example of the configuration of packet order preserving module 53, comprising a ring register in which pointers are used to construct chains for each output line. If an idle slot becomes available in a certain output line, the queue at the head of the chain associated with that line begins to be transferred. The example illustrated in FIG. 27 shows that packets arrived in the following orders: queue A, queue C, queue E on output line #1, and queue B, queue D on output line #2.

Figure 28:
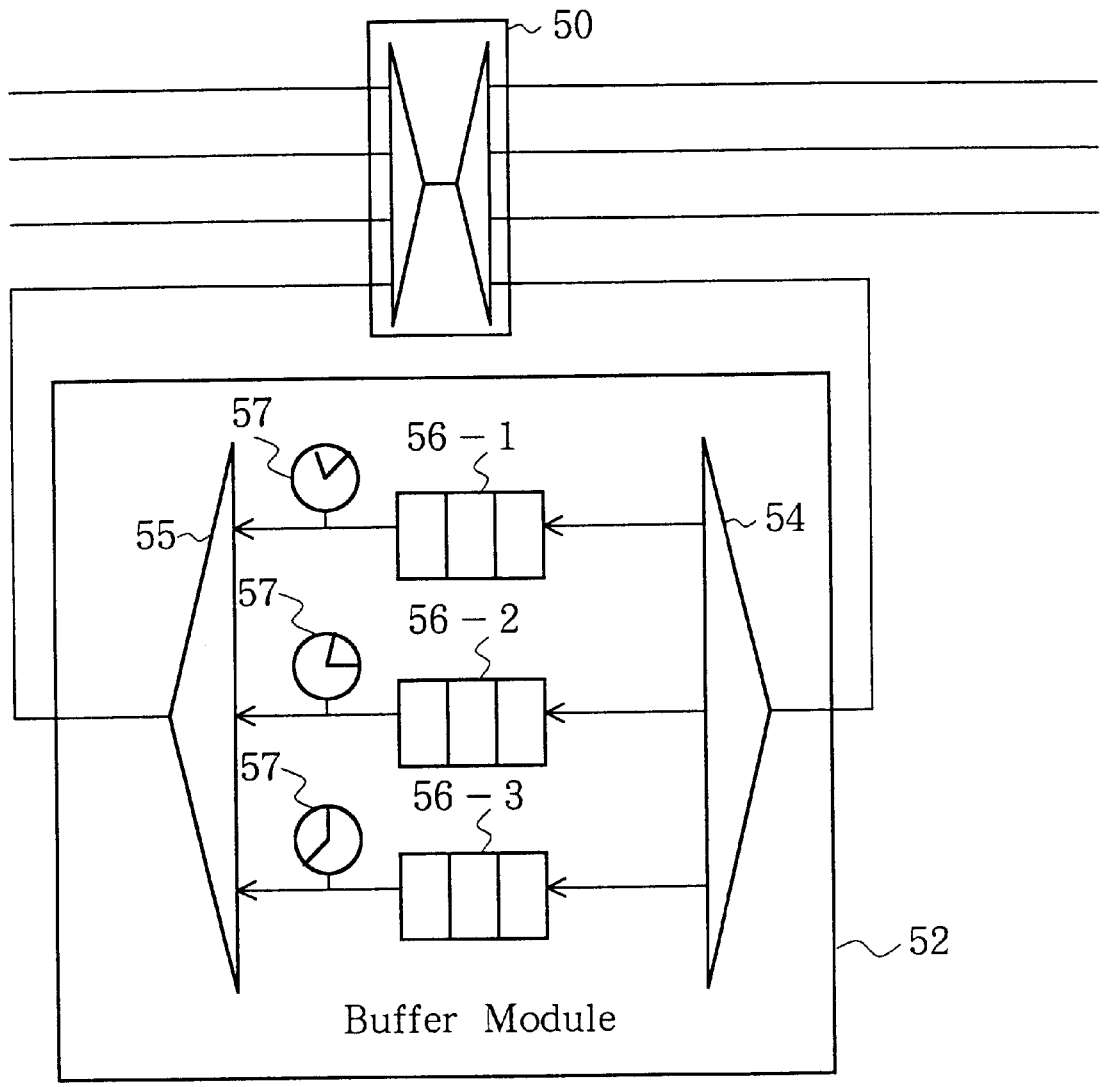
FIG. 28 is a block diagram of a second embodiment in which the order of the data written in time slots is preserved during communication.

FIG. 28 is a block diagram of a second embodiment in which the order of the data written in time slots is preserved during communication. This embodiment is provided with timers 57 which start when a corresponding packet is stored in buffer module 52. When a timer 57 has reached a specified time, a packet is output from buffer module 52. Buffer module 52 is divided logically into queues 56-1, 56-2 and 56-3 for each packet, and a timer 57 is provided for each queue. When packets are transferred to buffer module 52, queues 56-1, 56-2 and 56-3 are formed and their attendant timers 57 are set to prescribed values. When timers 57 finish timing, the packets start being transferred from buffer module 52.

In the embodiments illustrated in FIGS. 25 to 27, it was necessary to exchange information between output line idle time slot monitoring module 51 and buffer module 52, said information relating to the output lines on which idle time slots are available and being exchanged via packet order preserving module 53. As opposed to this, in the embodiment shown in FIG. 28 buffer module 52 can determine its operation autonomously, which makes it easy to construct a high-speed circuit.

Figure 29:
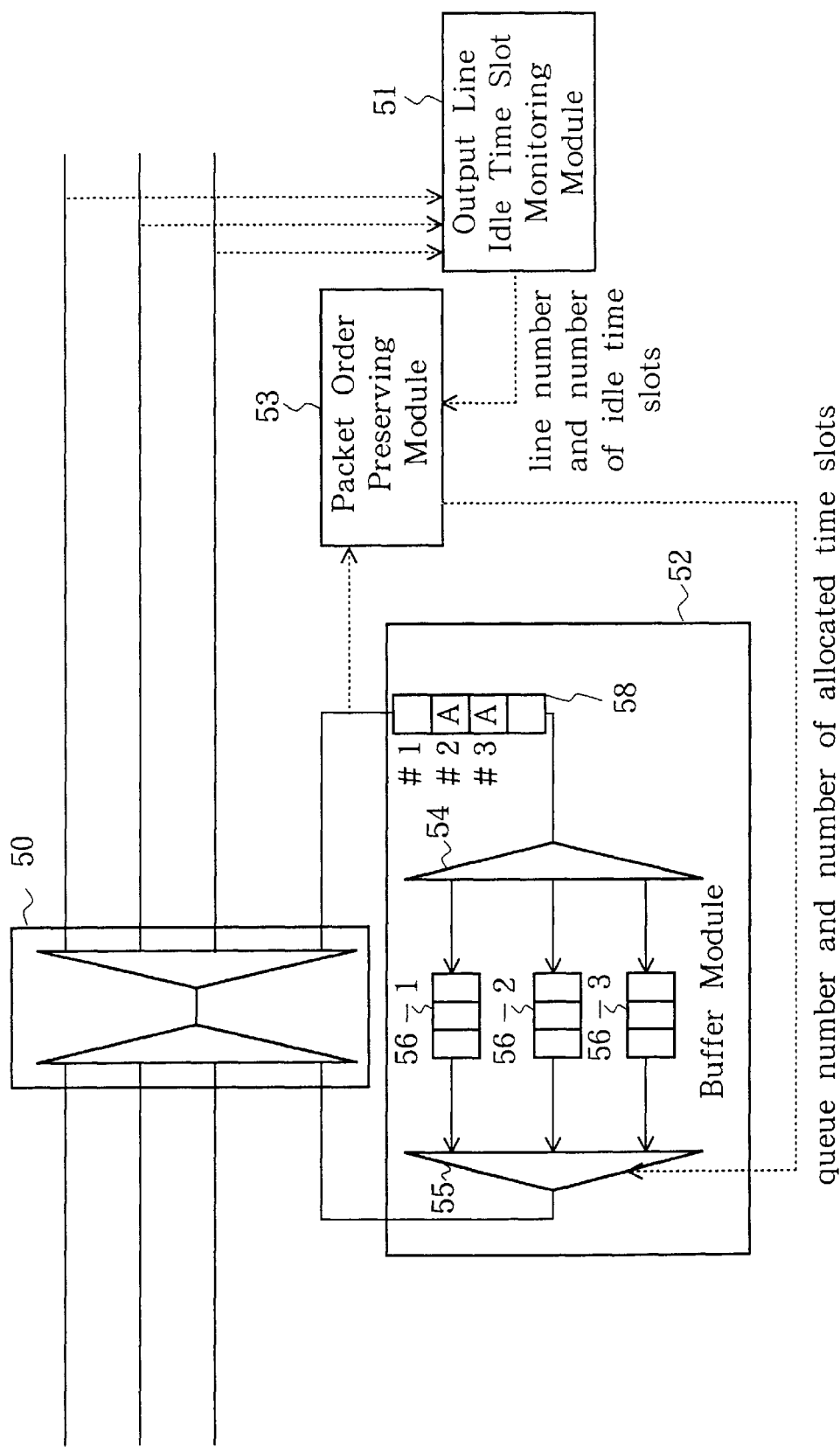
FIG. 29 is a block diagram of a third embodiment in which the order of the data written in time slots is preserved during communication.

FIG. 29 is a block diagram of a third embodiment in which the order of the data written in time slots is preserved during communication. This embodiment differs from the embodiments described above in that queues 56-1, 56-2 and 56-3 are provided for each time slot corresponding to a different route, and in that there is provided slot switching module 58 which causes packets directed to the same route to be stored in time slot queue 56-i (where i is an integer from 1 to 3) corresponding to this route. This slot switching module 58 serves to bundle a plurality of time slots in one logical queue. In the previous embodiment there was a one-to-one connection between a logical queue and a time slot on the time division multiplex line connecting buffer module 52 and line switching module 50, but in the present embodiment slot switching module 58 maps a plurality of time slots to a single logical queue. In the example illustrated in FIG. 29, the second and third slots in the time division multiplex line from line switching module 50 are allocated to queue A.

Figure 30:
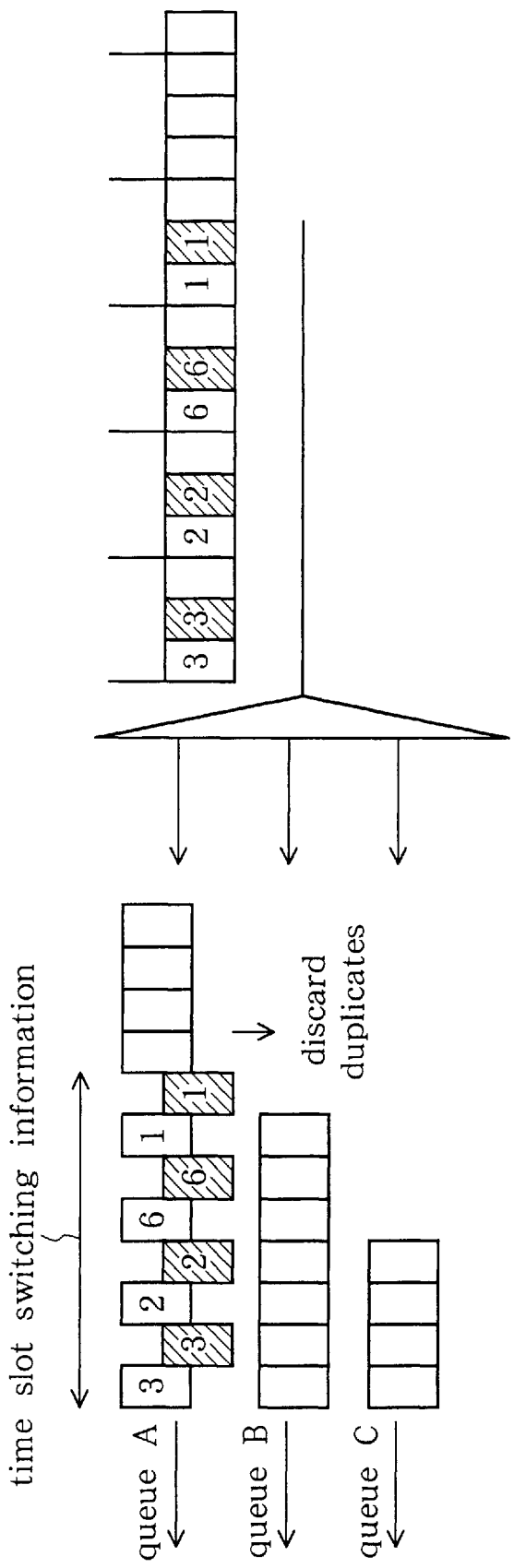
FIG. 30 serves to explain the situation where information is written to a queue in such a way that the time slot switching information at the head of the queue is not duplicated.

When information from a plurality of time slots is input to a single queue, it is written to the queue in such a way that the time slot switching information at the head of the data is not duplicated. In the example of FIG. 30, which illustrates this, the time slot switching information which has arrived in the first and second slots of frames in the time division multiplex line from line switching module 50 is "3", "2", "6" and "1". The duplicated time slot switching information is discarded without being written in queue A.

Figure 31:
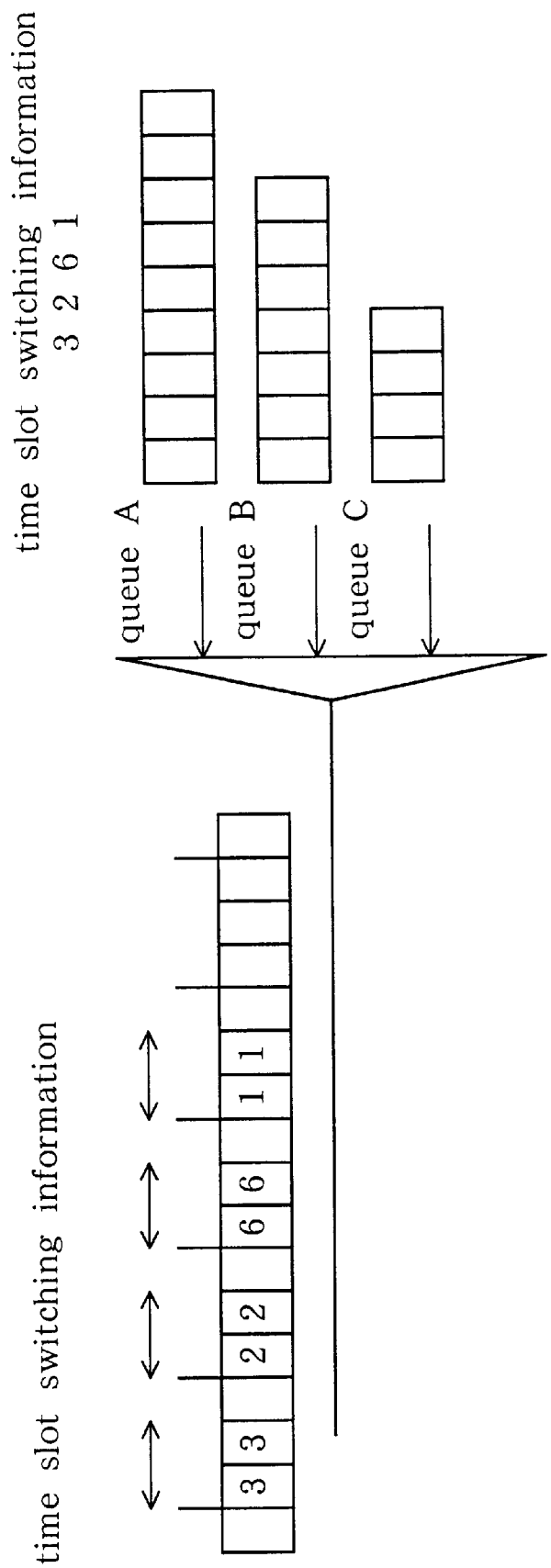
FIG. 31 serves to explain a situation where packets are transferred after duplicating time slot switching information.

Output line idle time slot monitoring module 51 monitors which time slots are idle in each output line, and when a slot becomes idle, notifies buffer module 52 of its line number and also the number of idle slots. When a packet is to be transferred, the number of time slots read from buffer module 52 is adjusted accordingly, up to the maximum number of idle slots on the output line. FIG. 31 shows the situation where a packet is transferred after copying the time slot switching information. If there are a plurality of time slots to read, as in FIG. 31, when the read is started the packet is transferred while copying the time slot switching information. In the example of FIG. 31, the first and second slots on the time division multiplex line from buffer module 52 to line switching module 50 were allocated to queue A.

Figure 32:
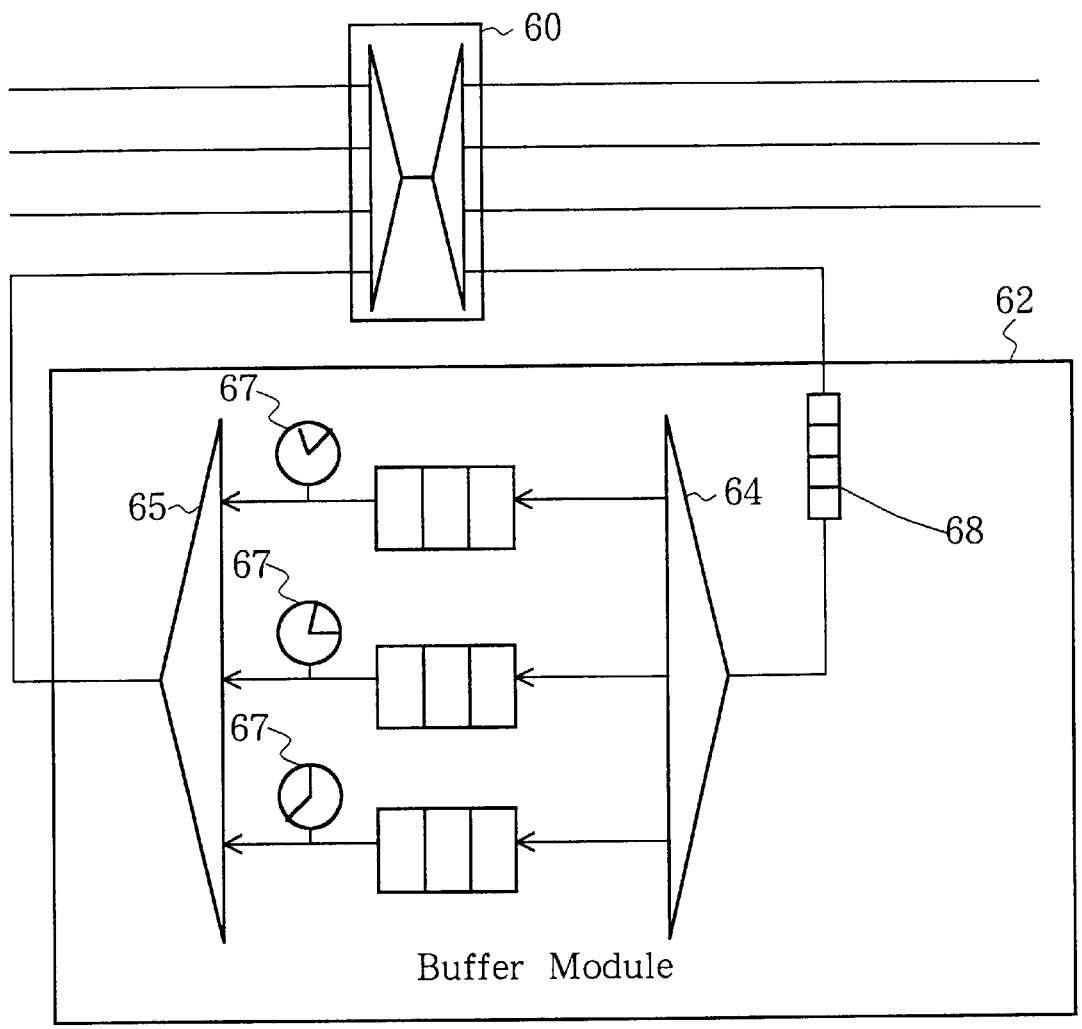
FIG. 32 is a block diagram of a fourth embodiment in which the order of the data written in time slots is preserved during communication.

FIG. 32 is a block diagram of a fourth embodiment in which the order of the data written in time slots is preserved during communication. This embodiment provides slot switching module 68 shown in FIG. 29, but using the embodiment illustrated in FIG. 28. The operation of each module is the same as that explained in these respective embodiments.

By thus communicating while preserving the order of the data written in the time slots, discarding of connection setup requests can be reduced. Consequently, because packet retransmission is also reduced, packet transfer delay can be shortened. Moreover, if a communication uses a plurality of time slots but only some of the time slots can be acquired at a particular link of the route, the communication can still be carried out while preserving the order of the data written in the time slots.

In order to avoid incorrect routing due to the wrong routing information, and a plurality of routing information corresponding to a plurality of subdivided sections has been provided, it is preferable to treat routing information relating to sections of the route which have already been passed as used information. An embodiment of this sort will be described with reference to FIGS. 33 to 35.

Figure 33:
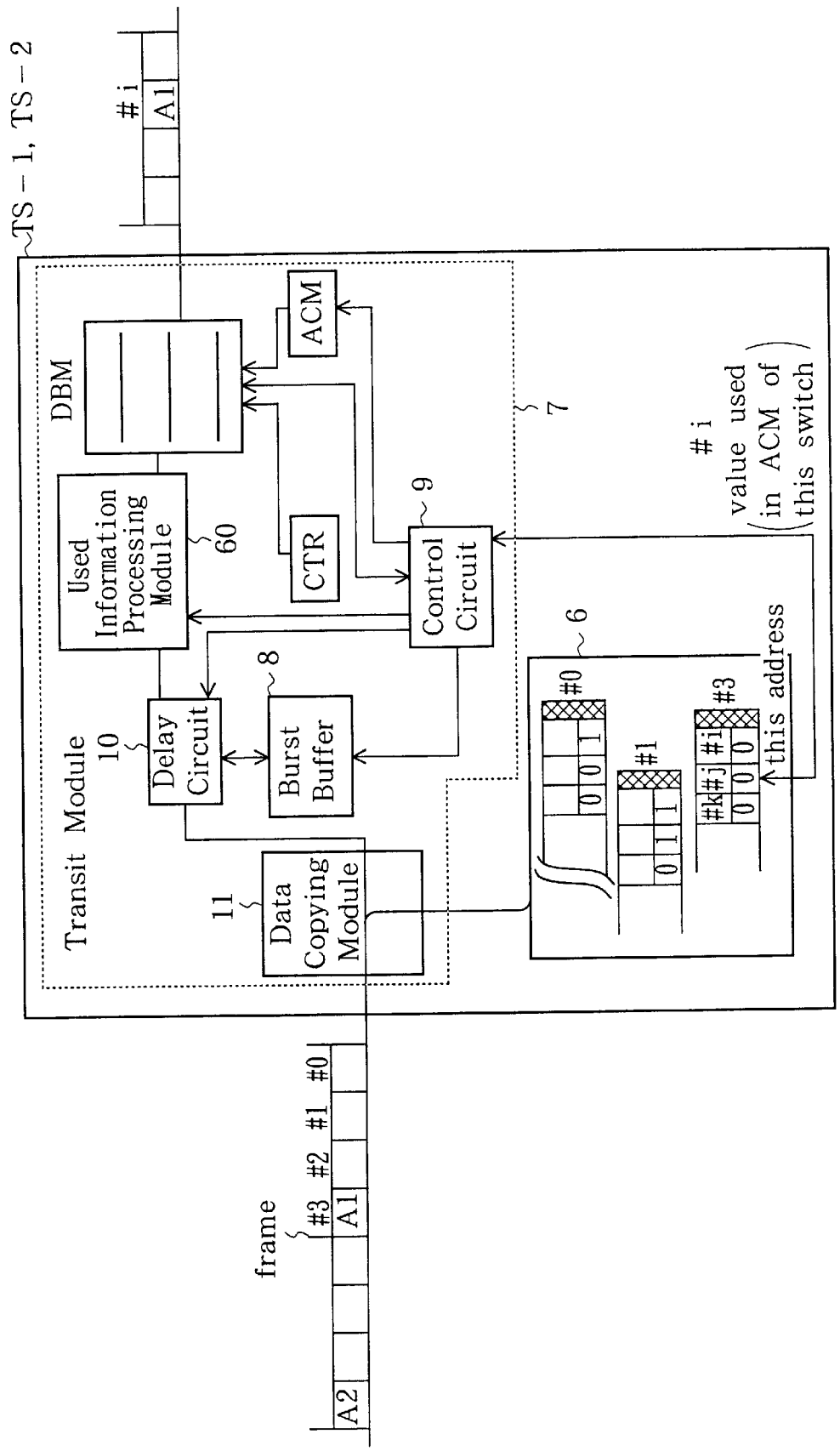
FIG. 33 is a block diagram showing an example of the configuration of a transit switch provided with a used information processing module.

FIG. 33 shows a transit switch configuration similar to that illustrated in FIG. 3, but differing in that used information processing module 60 is provided between delay circuit 10 and data buffer memory DBM. This used information processing module 60 classifies time slot switching information, which is routing information, into used and unused information, thereby avoiding the possibility of a transit switch routing using the wrong time slot switching information.

Figure 34:
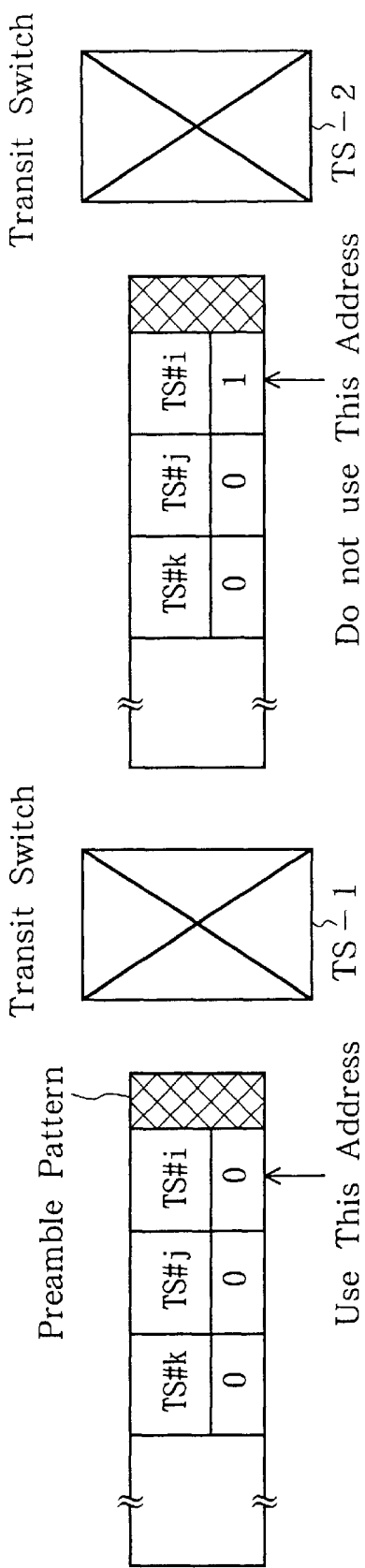
FIG. 34 serves to explain an example of the operation of a used information processing module.

FIG. 34 serves to explain an example of the operation of used information processing module 60, showing the change in the data after it passes a transit switch. In this example, a special bit is used to classify the time slot switching information into used and unused information. Namely, used information processing module 60 of a transit switch which has performed routing sets the special bit to "1" in the time slot switching information which the transit switch itself has used. In the example of FIG. 34, because transit switch TS-1 has performed routing using time slot switching information TS#i, the special bit is set to "1" at this address. When header look-up module 6 of transit switch TS-2 receives this time slot, it performs routing in accordance with the first of the time slot switching information remaining after the time slot switching information in which the special bit is set to "1" has been removed, namely, in accordance with TS#j. This enables transit switches TS-1 and TS-2 to avoid routing in accordance with the wrong time slot switching information.

Figure 35:
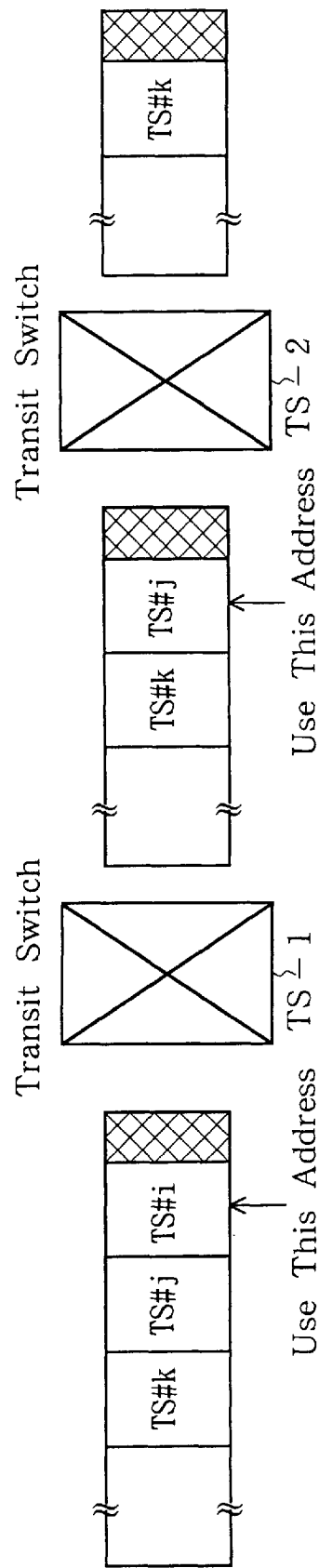
FIG. 35 serves to explain another example of the operation of a used information processing module.

FIG. 35 serves to explain another example of the operation of used information processing module 60, showing the change in the data after it passes through a transit switch. In this example, in order to classify time slot switching information into used and unused information, used time slot switching information is deleted. In the example of FIG. 35, because transit switch TS-1 has performed routing using time slot switching information TS#i, it deletes this information. When header look-up module 6 of transit switch TS-2 receives the illustrated time slot, it performs routing in accordance with the first time slot switching information TS#j. In this way, transit switches TS-1 and TS-2 can avoid routing in accordance with the wrong time slot switching information.

While the foregoing has described various embodiments, the scope of the invention is to be determined by the appended claims.

What is claimed is:

1. A circuit-switched, Synchronous Transfer Mode (STM) network comprising:
　a plurality of local switches each serving at least one terminal;
　at least one transit switch connecting said local switches; and
　wherein each of said plurality of local switches includes,
　　a packet-receiving module configured to receive a packet arriving from a terminal, said packet having a header in which an Internet Protocol (IP) address has been written,
　　a routing table containing routing information indicating which route should be used for transfer through said STM network to said IP address,
　　a routing header module configured to add to the packet a routing header containing the routing information corresponding to said IP address, said routing information having been obtained by looking up the routing table, and
　　a transmitting module configured to look at said routing header and transfer the packet to a time slot corresponding to said routing information; and
　wherein said at least one transit switch includes:
　　a header lookup module configured to look at said routing information contained in said packet header;
　　a relocation mechanism configured to relocate the packet, in accordance with the result obtained by said header lookup module, to a time slot corresponding to said routing information contained in said packet header;
　　a classification mechanism configured to classify said routing information into used routing information, which has been used by said relocation mechanism, and unused routing information; and
　　means for selecting the unused routing information from the routing information arriving at the transit switch.

2. A circuit-switched network as claimed in claim 1, wherein said classification mechanism includes means which appends a bit to the used routing information to indicate that the routing information has been used.

3. A circuit-switched network as claimed in claim 1, wherein said classification mechanism includes means which deletes the used routing information.

4. A circuit-switched network comprising a plurality of local switches each serving at least one terminal, and at least one transit switch connecting said local switches, the local switches and the at least one transit switch being connected via a Synchronous Transfer Mode (STM) network, wherein each local switch comprises:
　a packet-receiving module configured to receive a packet arriving from a terminal, said packet having a header in which an Internet Protocol (IP) address has been written;
　a routing table in which is recorded routing information indicating which route should be used for transfer through the STM network to said IP address;
　a routing header module configured to add to the packet a routing header containing the routing information corresponding to said IP address, said routing information having been obtained by looking up the routing table;
　a transmitting module configured to look at said routing header and transfer the packet to a time slot corresponding to said routing information;
　a plurality of routing information corresponding to a plurality of discrete route sections is provides;
　wherein the at least one transit switch comprises,
　　a header lookup module configured to look at said routing information contained in said packet header,
　　a relocation mechanism configured to relocate the packet, in accordance with the result obtained by said header lookup module, to a time slot corresponding to said routing information contained in said packet header,
　　each transit switch comprises means for classifying said plurality of routing information into used routing information, which has been used by the relocating means, and unused routing information, and
　　the look-up means of each transit switch includes means for selecting the unused routing information from the routing information arriving at the transit switch.

5. A circuit-switched network as claimed in claim 4, wherein the classifying means includes means which appends to used routing information a bit indicating that the routing information has been used.

6. A circuit-switched network as claimed in claim 4, wherein the classifying means includes means which deletes used routing information.

* * * * *